United States Patent
Gerrity et al.

(10) Patent No.: US 9,300,994 B2
(45) Date of Patent: Mar. 29, 2016

(54) METHODS AND SYSTEMS FOR VIEWING DYNAMICALLY CUSTOMIZED AUDIO-VISUAL CONTENT

(71) Applicant: Elwha LLC, Bellevue, WA (US)

(72) Inventors: Daniel A. Gerrity, Seattle, WA (US); William H. Gates, III, Medina, WA (US); Paul Holman, Seattle, WA (US); Roderick A. Hyde, Redmond, WA (US); Edward K. Y. Jung, Las Vegas, NV (US); Jordin T. Kare, Seattle, WA (US); Royce A. Levien, Lexington, MA (US); Robert W. Lord, Seattle, WA (US); Richard T. Lord, Tacoma, WA (US); Mark A. Malamud, Seattle, WA (US); Nathan P. Myhrvold, Bellevue, WA (US); John D Rinaldo, Jr., Bellevue, WA (US); Keith D. Rosema, Olympia, WA (US); Clarence T. Tegreene, Mercer Island, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/689,488

(22) Filed: Nov. 29, 2012

(65) Prior Publication Data

US 2014/0040930 A1 Feb. 6, 2014

Related U.S. Application Data

(63) Continuation-in-part of application No. 13/602,058, filed on Aug. 31, 2012, which is a continuation-in-part of application No. 13/566,723, filed on Aug. 3, 2012.

(51) Int. Cl.
*H04N 21/25* (2011.01)
*H04N 21/45* (2011.01)
(Continued)

(52) U.S. Cl.
CPC ....... *H04N 21/251* (2013.01); *H04N 21/25891* (2013.01); *H04N 21/2668* (2013.01);
(Continued)

(58) Field of Classification Search
CPC ............... H04N 21/25883; H04N 21/41415; H04N 21/43632; H04N 21/4532; H04N 21/44218; H04N 21/4415; H04N 7/16; H04N 21/441; H04N 21/4542; H04N 21/44222; H04N 21/44213
USPC .......................................... 725/38, 47, 7–16
See application file for complete search history.

(56) References Cited

U.S. PATENT DOCUMENTS

| 4,260,229 A | 4/1981 | Bloomstein |
| 4,569,026 A | 2/1986 | Best |

(Continued)

OTHER PUBLICATIONS

PCT International Search Report; International App. No. PCT/US2013/053444; Jan. 17, 2014; pp. 1-2.
(Continued)

*Primary Examiner* — Benjamin R Bruckart
*Assistant Examiner* — Akshay Doshi

(57) ABSTRACT

Systems and methods for viewing dynamically customized audio-visual content are described. In some implementations, a process may include providing at least one selection signal indicative of a preference, receiving a dynamically customized audio-visual content including an audio-visual core portion at least partially modified with at least one revised content portion in accordance with the at least one selection signal, and displaying the dynamically-customized audio-visual content.

33 Claims, 19 Drawing Sheets

(51) Int. Cl.
*H04N 21/442* (2011.01)
*H04N 21/2668* (2011.01)
*H04N 21/4415* (2011.01)
*H04N 21/475* (2011.01)
*H04N 21/258* (2011.01)
*H04N 21/61* (2011.01)
*H04N 21/458* (2011.01)
*H04N 21/431* (2011.01)
*H04N 21/81* (2011.01)
*H04N 21/422* (2011.01)

(52) U.S. Cl.
CPC ..... *H04N21/42201* (2013.01); *H04N 21/4318* (2013.01); *H04N 21/4415* (2013.01); *H04N 21/44213* (2013.01); *H04N 21/44218* (2013.01); *H04N 21/44222* (2013.01); *H04N 21/458* (2013.01); *H04N 21/4532* (2013.01); *H04N 21/4755* (2013.01); *H04N 21/4756* (2013.01); *H04N 21/6125* (2013.01); *H04N 21/8106* (2013.01)

(56) References Cited

U.S. PATENT DOCUMENTS

| | | | |
|---|---|---|---|
| 4,600,281 A | 7/1986 | Bloomstein | |
| 4,827,532 A | 5/1989 | Bloomstein | |
| 4,884,972 A | 12/1989 | Gasper | |
| 5,111,409 A | 5/1992 | Gasper et al. | |
| 5,623,587 A | 4/1997 | Bulman | |
| 5,926,575 A | 7/1999 | Ohzeki et al. | |
| 6,054,999 A | 4/2000 | Strandberg | |
| 6,317,593 B1 | 11/2001 | Vossler | |
| 7,020,888 B2 | 3/2006 | Reynolds et al. | |
| 7,109,993 B2 | 9/2006 | Peleg et al. | |
| 7,631,327 B2 | 12/2009 | Dempski et al. | |
| 7,865,567 B1 | 1/2011 | Hendricks et al. | |
| 7,945,926 B2 | 5/2011 | Dempski et al. | |
| 8,016,653 B2 | 9/2011 | Pendleton et al. | |
| 8,059,201 B2 | 11/2011 | Aarts et al. | |
| 8,725,559 B1 | 5/2014 | Kothari et al. | |
| 8,726,312 B1 * | 5/2014 | Hewinson | H04N 21/23614 725/32 |
| 2002/0029384 A1 | 3/2002 | Griggs | |
| 2002/0063714 A1 | 5/2002 | Haas et al. | |
| 2002/0075318 A1 | 6/2002 | Yang et al. | |
| 2002/0077900 A1 | 6/2002 | Thompson et al. | |
| 2002/0120931 A1 | 8/2002 | Huber et al. | |
| 2002/0133397 A1 | 9/2002 | Wilkins | |
| 2003/0051256 A1 | 3/2003 | Uesaki et al. | |
| 2003/0163371 A1 | 8/2003 | Beard | |
| 2004/0181592 A1 | 9/2004 | Samra et al. | |
| 2005/0138656 A1 | 6/2005 | Moore et al. | |
| 2006/0074550 A1 | 4/2006 | Freer et al. | |
| 2007/0005795 A1 | 1/2007 | Gonzalez | |
| 2007/0099684 A1 | 5/2007 | Butterworth | |
| 2007/0155307 A1 | 7/2007 | Ng et al. | |
| 2007/0162951 A1 | 7/2007 | Rashkovskiy et al. | |
| 2007/0165022 A1 | 7/2007 | Peleg et al. | |
| 2007/0214473 A1 | 9/2007 | Barton et al. | |
| 2007/0244750 A1 | 10/2007 | Grannan et al. | |
| 2007/0271580 A1 | 11/2007 | Tischer et al. | |
| 2007/0288978 A1 | 12/2007 | Pizzurro et al. | |
| 2007/0294740 A1 | 12/2007 | Drake et al. | |
| 2008/0065468 A1 | 3/2008 | Berg et al. | |
| 2008/0215436 A1 | 9/2008 | Roberts | |
| 2008/0250468 A1 | 10/2008 | Sullivan et al. | |
| 2009/0048914 A1 * | 2/2009 | Shenfield et al. | 705/14 |
| 2009/0119704 A1 | 5/2009 | Dimitrova et al. | |
| 2009/0138332 A1 | 5/2009 | Kanevsky et al. | |
| 2009/0138805 A1 | 5/2009 | Hildreth | |
| 2009/0144772 A1 | 6/2009 | Fink et al. | |
| 2009/0187944 A1 | 7/2009 | White et al. | |
| 2009/0210902 A1 | 8/2009 | Slaney et al. | |
| 2009/0249409 A1 | 10/2009 | Bhogal et al. | |
| 2009/0254931 A1 | 10/2009 | Pizzurro et al. | |
| 2009/0265214 A1 | 10/2009 | Jobs et al. | |
| 2009/0282093 A1 | 11/2009 | Allard et al. | |
| 2010/0083306 A1 | 4/2010 | Dempski et al. | |
| 2010/0094841 A1 | 4/2010 | Bardwil | |
| 2010/0125544 A1 | 5/2010 | Lee et al. | |
| 2010/0257551 A1 | 10/2010 | Sweeney et al. | |
| 2011/0010231 A1 | 1/2011 | Price et al. | |
| 2011/0029099 A1 | 2/2011 | Benson | |
| 2011/0064388 A1 | 3/2011 | Brown et al. | |
| 2011/0066730 A1 | 3/2011 | Julia et al. | |
| 2011/0271301 A1 * | 11/2011 | Kennedy | 725/38 |
| 2011/0321075 A1 | 12/2011 | Brunkhorst et al. | |
| 2011/0321082 A1 * | 12/2011 | Weerasinghe | H04N 21/44008 725/31 |
| 2012/0030699 A1 | 2/2012 | Amin | |
| 2012/0060176 A1 | 3/2012 | Chai et al. | |
| 2012/0072936 A1 | 3/2012 | Small et al. | |
| 2012/0094768 A1 | 4/2012 | McCaddon et al. | |
| 2012/0112877 A1 * | 5/2012 | Gravino et al. | 340/4.31 |
| 2012/0135684 A1 * | 5/2012 | Shrum et al. | 455/41.2 |
| 2012/0324493 A1 | 12/2012 | Holmdahl et al. | |
| 2013/0014145 A1 | 1/2013 | Bhatia et al. | |
| 2013/0046637 A1 | 2/2013 | Slutsky et al. | |
| 2013/0091243 A1 | 4/2013 | Harnevo et al. | |
| 2013/0145240 A1 | 6/2013 | Anderson et al. | |
| 2013/0160051 A1 | 6/2013 | Armstrong et al. | |
| 2013/0283162 A1 | 10/2013 | Aronsson et al. | |
| 2013/0290233 A1 * | 10/2013 | Ferren et al. | 706/46 |
| 2013/0312018 A1 * | 11/2013 | Elliott et al. | 725/12 |

OTHER PUBLICATIONS

Young, Robert; "Google . . . the OS for Advertising," GIGAOM; Nov. 9, 2006; http://gigaom.com/2006/11/09/google-the-os-for-advertising/.

* cited by examiner

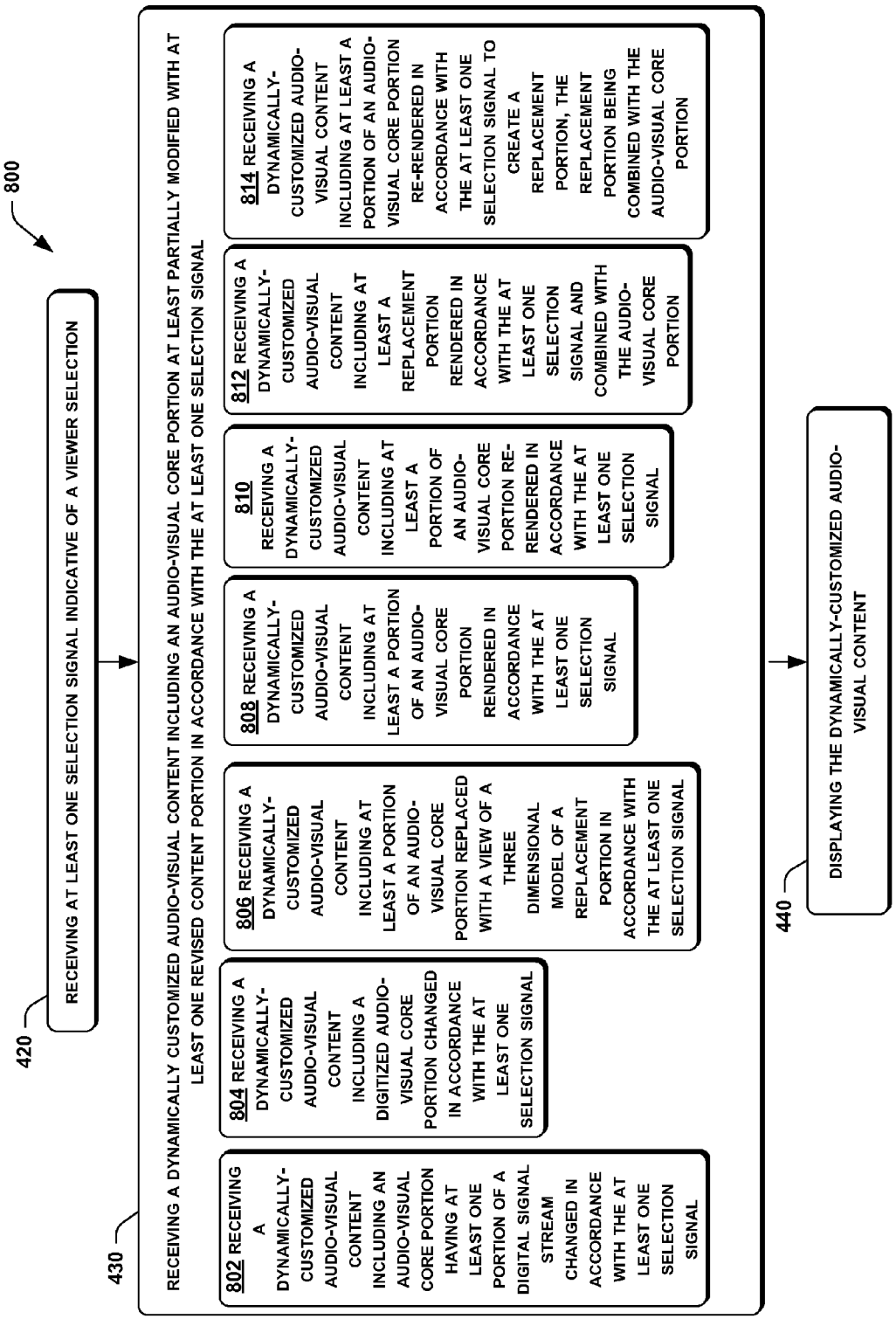

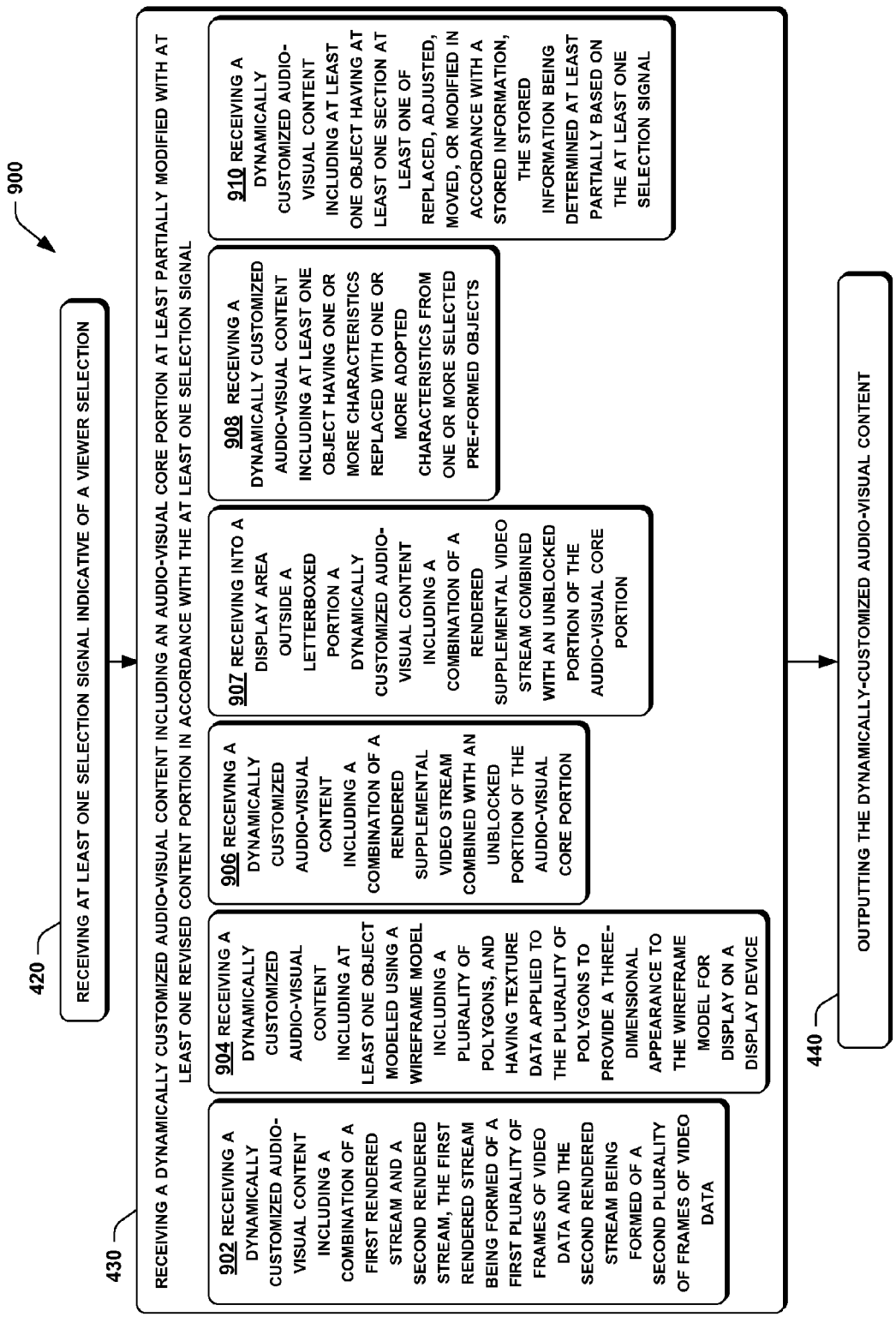

METHODS AND SYSTEMS FOR VIEWING DYNAMICALLY CUSTOMIZED AUDIO-VISUAL CONTENT

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of U.S. patent application Ser. No. 13/602,058, entitled Dynamic Customization and Monetization of Audio-Visual Content, naming William H. Gates, III, Daniel A. Gerrity, Pablos Holman, Roderick A. Hyde, Edward K. Y. Jung, Jordin T. Kare, Royce A. Levien, Robert W. Lord, Richard T. Lord, Mark A. Malamud, Nathan P. Myhrvold, John D. Rinaldo, Jr., Keith D. Rosema, Casey T. Tegreene, and Lowell L. Wood, Jr. as inventors, filed 31 Aug., 2012,which is currently co-pending or is an application of which a currently co-pending application is entitled to the benefit of the filing date, and which is a continuation of U.S. patent application Ser. No. 13/566,723, entitled Dynamic Customization and Monetization of Audio-Visual Content, naming William H. Gates, III, Daniel A. Gerrity, Pablos Holman, Roderick A. Hyde, Edward K. Y. Jung, Jordin T. Kare, Royce A. Levien, Robert W. Lord, Richard T. Lord, Mark A. Malamud, Nathan P. Myhrvold, John D. Rinaldo, Jr., Keith D. Rosema, Casey T. Tegreene, and Lowell L. Wood, Jr. as inventors, filed 3 Aug., 2012.

RELATED APPLICATIONS

None.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

FIELD OF THE DISCLOSURE

The present disclosure relates generally to viewing of dynamically customized audio-visual content, such as television broadcasts, internet streams, podcasts, audio broadcasts, and the like.

BACKGROUND

Conventional audio-visual content, including television broadcasts or the like, typically consist of either pre-recorded content or live events that do not allow viewers to interact with or control any of the audio-visual content that is displayed. Various concepts have recently been introduced that allow for television broadcasts to be modified to a limited degree to accommodate viewer choices, as disclosed by U.S. Pat. Nos. 7,945,926 and 7,631,327 entitled "Enhanced Custom Content Television" issued to Dempski et al. Such prior art systems and methods are relatively limited, however, in their ability to accommodate and assimilate viewer-related information to provide a dynamically tailored audio-visual content stream. Systems and methods for dynamic customization of audio-visual content, such as television broadcasts, internet streams, podcasts, audio broadcasts, and the like, that provide an improved degree of accommodation or assimilation of viewer-related choices and characteristics would have considerable utility.

SUMMARY

The present disclosure teaches systems and methods for viewing dynamically customized audio-visual content, such as television broadcasts, internet streams, podcasts, audio broadcasts, and the like. For example, in at least some implementations, a process may include providing at least one selection signal indicative of a preference, receiving a dynamically customized audio-visual content including an audio-visual core portion at least partially modified with at least one revised content portion in accordance with the at least one selection signal, and displaying the dynamically-customized audio-visual content.

This summary is intended to provide an introduction of a few exemplary aspects of implementations in accordance with the present disclosure. It is not intended to provide an exhaustive explanation of all possible implementations, and should thus be construed as merely introductory, rather than limiting, of the following disclosure.

BRIEF DESCRIPTION OF THE DRAWINGS

FIGS. 4 through 16 are flowcharts of processes for viewing dynamically customized audio-visual content in accordance with further possible implementations of the present disclosure.

DETAILED DESCRIPTION

Techniques for viewing dynamically customized audio-visual content, such as television broadcasts, internet streams, podcasts, audio broadcasts, and the like, will now be disclosed in the following detailed description. It will be appreciated that many specific details of certain implementations will be described and shown in FIGS. 1 through 19 to provide a thorough understanding of such implementations. One skilled in the art will understand, however, that the present disclosure may have other possible implementations, and that such other implementations may be practiced with or without some of the particular details set forth in the following description.

In the following discussion, exemplary systems or environments for implementing one or more of the teachings of the present disclosure are described first. Next, exemplary flow charts showing various embodiments of processes for dynamic customization of audio-visual content in accordance with one or more of the teachings of the present disclosure are described.

Exemplary Systems for Dynamic Customization of Audio-Visual Content

Embodiments of methods and systems in accordance with the present disclosure may be implemented in a variety of environments. Initially, methods and systems in accordance with the present disclosure will be described in terms of dynamic customization of audio-visual content, such as television broadcasts, internet streams, podcasts, audio broadcasts, and the like. It should be remembered, however, that inventive aspects of such methods and systems may be applied to other environments that involve audio-visual content, and are not necessarily limited to the specific audio-visual content implementations specifically described herein.

Figure 1:
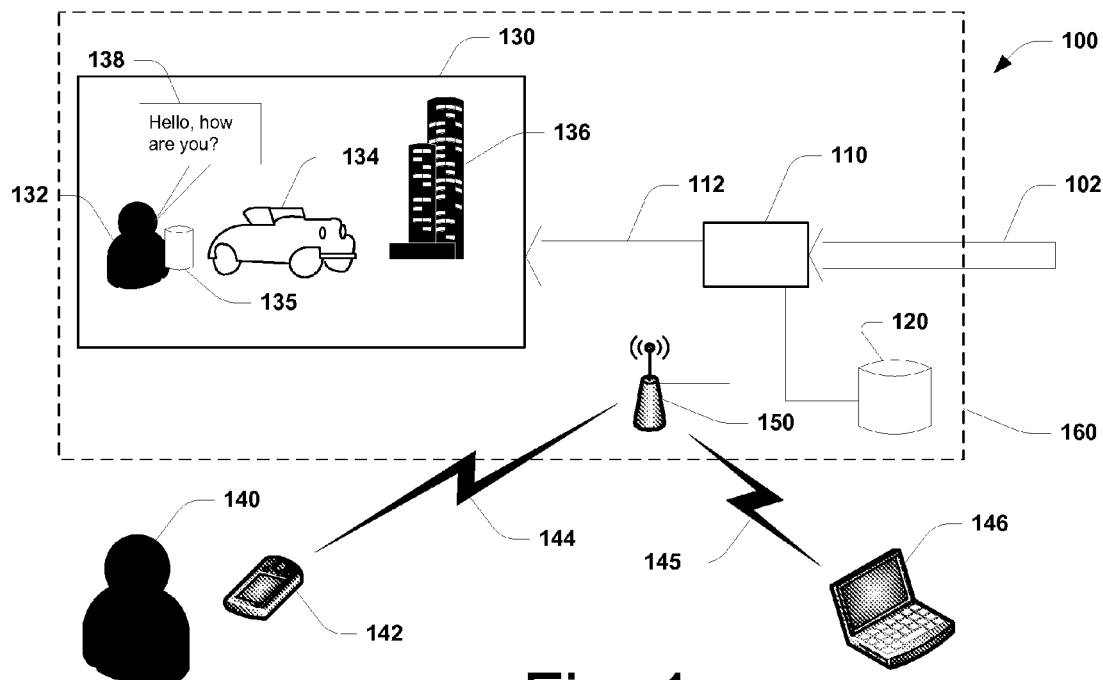
FIGS. 1-3 show schematic views of systems for dynamic customization of audio-visual content in accordance with possible implementations of the present disclosure.

FIG. 1 is a schematic view of a representative system 100 for dynamic customization of audio-visual content in accordance with an implementation of the present disclosure. In this implementation, the system 100 includes a processing component 110 that receives an audio-visual core portion 102, such as a television broadcast, and provides a dynamically customized audio-visual content 112 to a display 130. In some implementations, a viewer 140 uses a control device 142 to provide one or more selection signals 144 to a sensor 150 which, in turn, provides inputs corresponding to the selection signals 144 to the processing component 110. Alternately, the processing component 110 may operate without selection signals 144, such as by accessing default inputs stored within a memory. In some embodiments, the sensor 150 may receive further supplemental selection signals 145 from a processing device 146 (e.g. laptop, desktop, personal data assistant, cell phone, iPad, iPhone, etc.) associated with the viewer 140.

As described more fully below, based on the one or more selection signals 144 (or default inputs if specific inputs are not provided), the processing component 110 may modify one or more aspects of the incoming audio-visual core portion 102 to provide the dynamically customized audio-visual content 112 that is shown on the display 130. In at least some implementations, the processing component 110 may access a data store 120 having revised content portions stored therein to perform one or more aspects of the processes described below.

In at least some implementations, the processing component 110 may modify the core portion 102 by a rendering process. The rendering process is preferably a real-time (or approximately real-time) process. The rendering process may receive the core portion 102 as a digital signal stream, and may modify one or more aspects of the core portion 102, such as by replacing one or more portions of the core portion 102 with one or more revised content portions retrieved from the data store 120, in accordance with the selection signals 144 (and/or default inputs). It should be appreciated that, in some embodiments, the audio-visual core portion 102 may consist of solely an audio portion, or solely a visual (or video) portion, or may include a separate audio portion and a separate visual portion. In further embodiments, the audio-visual core portion 102 may include a plurality of audio portions or a plurality of visual portions, or any suitable combination thereof.

As used herein, the term "visual" in such phrases as "audio-visual portion," "audio-visual core portion," "visual portion," etc. is used broadly to refer to signals, data, information, or portions thereof that are associated with something which may eventually be viewed on a suitable display device by a viewer (e.g. video, photographs, images, etc.). It should be understood that a "visual portion" is not intended to mean that the signals, data, information, or portions thereof are themselves visible to a viewer. Similarly, as used herein, the term "audio" in such phrases as "audio-visual portion," "audio-visual core portion," "audio portion," etc. is used broadly to refer to signals, data, information, or portions thereof that are associated with something which may eventually produce sound on a suitable output device to a listener, and are not intended to mean that the signals, data, information, or portions thereof are themselves audible to a listener.

It will be appreciated that the components of the system 100 shown in FIG. 1 are merely exemplary, and represent one possible implementation of a system in accordance with the present disclosure. The various components of the system 100 may communicate and exchange information as needed to perform the functions and operations described herein. More specifically, in various implementations, each of the components of the system 100 may be implemented using software, hardware, firmware, or any suitable combinations thereof. Similarly, one or more of the components of the system 100 may be combined, or may be divided or separated into additional components, or additional components may be added, or one or more of the components may simply be eliminated, depending upon the particular requirements or specifications of the operating environment.

It will be appreciated that other suitable embodiments of systems for dynamic customization of audio-visual broadcasts may be conceived. For example, in some embodiments, the display 130 may be that associated with a conventional television or other conventional audio-visual display device, and the processing component 110 may be a separate component, such as a gaming device (e.g. Microsoft Xbox®, Sony Playstation®, Nintendo Wii®, etc.), a media player (e.g. DVD player, Blu Ray device, Tivo, etc.), or any other suitable component. Similarly, the sensor 150 may be a separate component or may alternately be integrated into the same component with the display 130 or the processing component 110. Similarly, the information store 120 may be a separate component or may alternately be integrated into the same component with the processing component 110, the display 130, or the sensor 150. Alternately, some or all of the components (e.g. the processing component 110, the information store 120, the display 130, the sensor 150, etc.) may be integrated into a common component 160.

Figure 2:
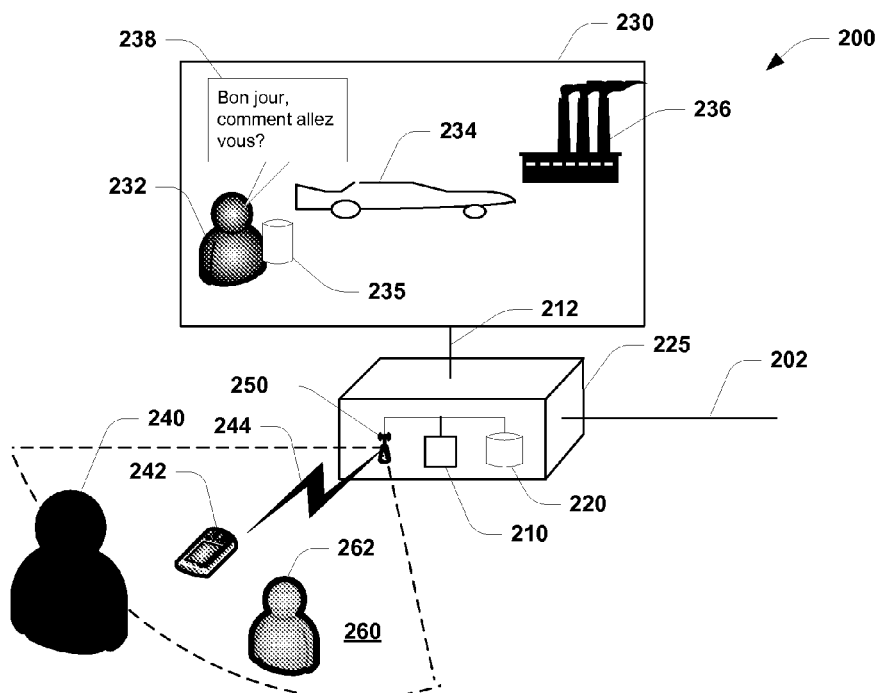

FIG. 2 is a schematic view of another representative system 200 for dynamic customization of audio-visual content in accordance with an implementation of the present disclosure. In this implementation, the system 200 includes a processing component 210 that receives an audio-visual core portion 202, and provides a dynamically customized audio-visual content 212 to a display 230. A viewer 240 uses a control device 242 to provide one or more selection signals 244 to a sensor 250 which, in turn, provides inputs corresponding to the selection signals 244 to the processing component 210. As described above, the processing component 210 may also operate without selection signals 244, such as by accessing default inputs stored within a memory 220. The sensor 250 may sense a field of view 260 to detect the viewer 240 or other one or more other persons 262. In the implementation shown in FIG. 2, the processing component 210, the memory 220, and the sensor 250 are housed within a single device 225.

As described more fully below, based on the one or more selection signals 244 (or default inputs if specific inputs are not provided), the processing component 210 may modify one or more aspects of the incoming audio-visual core portion 202 to provide the dynamically customized audio-visual content 212 that is shown on the display 230. The processing component 210 may also modify one or more aspects of the incoming audio-visual core portion 202 based on one or more persons (e.g. viewer 240, other person 262) sensed within the filed of view 260. In at least some implementations, the processing component 210 may retrieve revised content portions stored in the memory 220 to perform one or more aspects of the processes described below.

Figure 3:
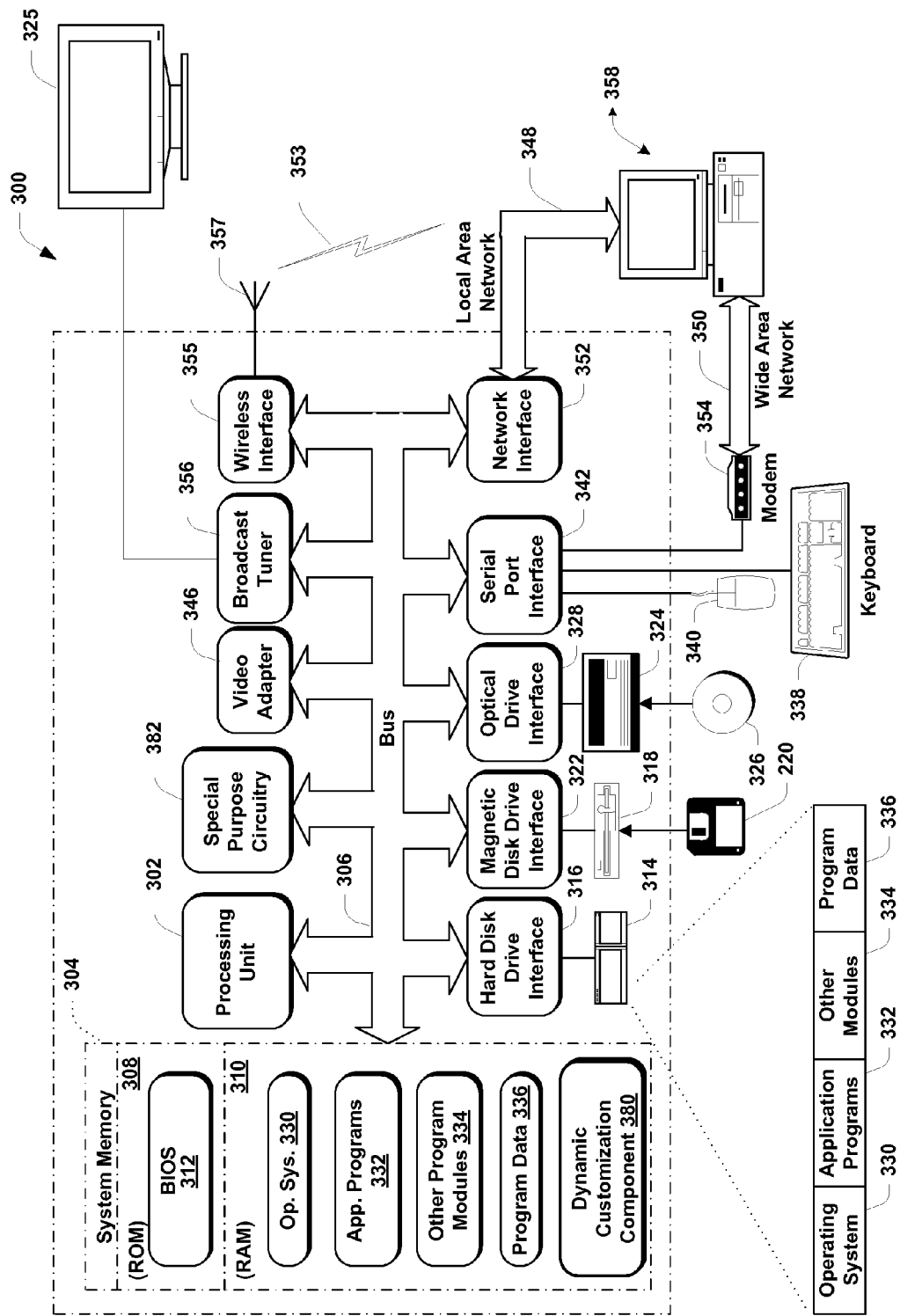

FIG. 3 shows another representative implementation of a system 300 for dynamic customization of audio-visual content in accordance with another possible embodiment. In this implementations the system 300 may include one or more processors (or processing units) 302, special purpose circuitry 382, a memory 304, and a bus 306 that couples various system components, including the memory 304, to the one or more processors 302 and special purpose circuitry 382 (e.g. ASIC, FPGA, etc.). The bus 306 represents one or more of any of several types of bus structures, including a memory bus or memory controller, a peripheral bus, an accelerated graphics port, and a processor or local bus using any of a variety of bus architectures. In this implementation, the memory 304 includes read only memory (ROM) 308 and random access memory (RAM) 310. A basic input/output system (BIOS) 312, containing the basic routines that help to transfer information between elements within the system 300, such as during start-up, is stored in ROM 308.

The exemplary system 300 further includes a hard disk drive 314 for reading from and writing to a hard disk (not shown), and is connected to the bus 306 via a hard disk driver interface 316 (e.g., a SCSI, ATA, or other type of interface). A magnetic disk drive 318 for reading from and writing to a removable magnetic disk 320, is connected to the system bus 306 via a magnetic disk drive interface 322. Similarly, an optical disk drive 324 for reading from or writing to a removable optical disk 326 such as a CD ROM, DVD, or other optical media, connected to the bus 306 via an optical drive interface 328. The drives and their associated computer-readable media provide nonvolatile storage of computer readable instructions, data structures, program modules and other data for the system 300. Although the exemplary system 300 described herein employs a hard disk, a removable magnetic disk 320 and a removable optical disk 326, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

As further shown in FIG. 3, a number of program modules may be stored on the memory 304 (e.g. the ROM 308 or the RAM 310) including an operating system 330, one or more application programs 332, other program modules 334, and program data 336 (e.g. the data store 320, image data, audio data, three dimensional object models, etc.). Alternately, these program modules may be stored on other computer-readable media, including the hard disk, the magnetic disk 320, or the optical disk 326. For purposes of illustration, programs and other executable program components, such as the operating system 330, are illustrated in FIG. 3 as discrete blocks, although it is recognized that such programs and components reside at various times in different storage components of the system 300, and may be executed by the processor(s) 302 or the special purpose circuitry 382 of the system 300.

A user may enter commands and information into the system 300 through input devices such as a keyboard 338 and a pointing device 340. Other input devices (not shown) may include a microphone, joystick, game pad, satellite dish, scanner, or the like. These and other input devices are connected to the processing unit 302 and special purpose circuitry 382 through an interface 342 that is coupled to the system bus 306. A monitor 325 (e.g. display 130, display 230, or any other display device) may be connected to the bus 306 via an interface, such as a video adapter 346. In addition, the system 300 may also include other peripheral output devices (not shown) such as speakers and printers.

The system 300 may operate in a networked environment using logical connections to one or more remote computers (or servers) 358. Such remote computers (or servers) 358 may be a personal computer, a server, a router, a network PC, a peer device or other common network node, and may include many or all of the elements described above relative to system 300. The logical connections depicted in FIG. 3 may include one or more of a local area network (LAN) 348 and a wide area network (WAN) 350. Such networking environments are commonplace in offices, enterprise-wide computer networks, intranets, and the Internet. In this embodiment, the system 300 also includes one or more broadcast tuners 356. The broadcast tuner 356 may receive broadcast signals directly (e.g., analog or digital cable transmissions fed directly into the tuner 356) or via a reception device (e.g., via sensor 150, sensor 250, an antenna, a satellite dish, etc.).

When used in a LAN networking environment, the system 300 may be connected to the local network 348 through a network interface (or adapter) 352. When used in a WAN networking environment, the system 300 typically includes a modem 354 or other means for establishing communications over the wide area network 350, such as the Internet. The modem 354, which may be internal or external, may be connected to the bus 306 via the serial port interface 342. Similarly, the system 300 may exchange (send or receive) wireless signals 353 (e.g. selection signals 144, signals 244, core portion 102, core portion 202, etc.) with one or more remote devices (e.g. remote 142, remote 242, computers 258, etc.), using a wireless interface 355 coupled to a wireless communicator 357 (e.g., sensor 150, sensor 250, an antenna, a satellite dish, a transmitter, a receiver, a transceiver, a photoreceptor, a photodiode, an emitter, a receptor, etc.).

In a networked environment, program modules depicted relative to the system 300, or portions thereof, may be stored in the memory 304, or in a remote memory storage device. More specifically, as further shown in FIG. 3, a dynamic customization component 380 may be stored in the memory 304 of the system 300. The dynamic customization component 380 may be implemented using software, hardware, firmware, or any suitable combination thereof. In cooperation with the other components of the system 300, such as the processing unit 302 or the special purpose circuitry 382, the dynamic customization component 380 may be operable to perform one or more implementations of processes for dynamic customization in accordance with the present disclosure.

It will be appreciated that while the system 300 shown in FIG. 3 is capable of receiving an audio-visual core portion (e.g. core portion 102, core portion 202, etc.) from an external source (e.g. via the wireless device 357, the LAN 348, the WAN 350, etc.), in further embodiments, the audio-visual core portion may itself be generated within the system 300, such as by playing media stored within the system memory 304, or stored within the hard disk drive 314, or played on the disk drive 318, the optical drive 328, or any other suitable component of the system 300. In some implementations, the audio-visual core portion may be generated by suitable software routines operating within the system 300.

Of course, other environments may be implemented to perform the dynamic customization of audio-visual content streams in accordance with the present disclosure, and systems in accordance with the present disclosure are not necessarily limited to the specific implementations shown and described herein. Additional functions and operational aspects of systems in accordance with the teachings of the present disclosure are described more fully below.

Exemplary Processes for Viewing Dynamically Customized Audio-Visual Content

In the following description of exemplary processes for viewing dynamically customized audio-visual content, reference will be made to specific components of the exemplary systems described above and shown in FIGS. 1 through 3. It will be appreciated, however, that such references are merely exemplary, and that the inventive processes are not limited to being implemented on the specific systems described above, but rather, the processes described herein may be implemented on a wide variety of suitable systems and in a wide variety of suitable environments.

Figure 4:
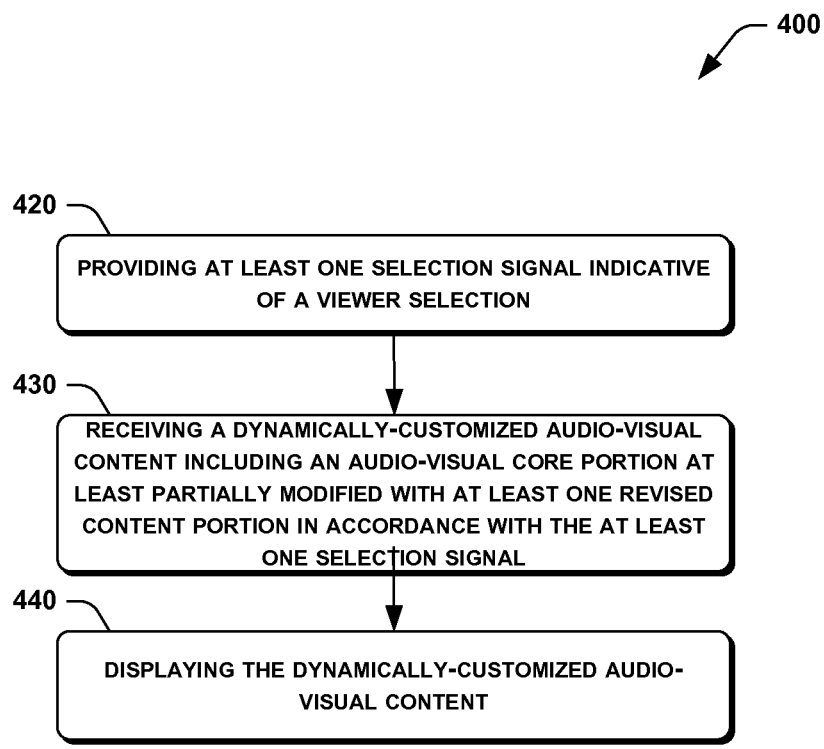

FIG. 4 shows a flowchart of a process 400 for viewing dynamically customized audio-visual content in accordance with an implementation of the present disclosure. In this implementation, the process 400 includes providing at least one selection signal indicative of a preference at 420, and receiving a dynamically customized audio-visual content including an audio-visual core portion at least partially modified with at least one revised content portion in accordance with the at least one selection signal at 430, and displaying the dynamically-customized audio-visual content at 440. It will be appreciated that in accordance with the present disclosure, a user (e.g. viewer 140) may indicate preferences for actresses (and actors) 132, vehicles 134, depicted products (or props) 135, environmental aspects 136 (e.g. buildings, scenery, setting, background, lighting, etc.), and/or language 138. Of course, in further implementations, virtually any desired aspect of the incoming core portion 102 may be dynamically customized in accordance with the viewer's selections, preferences, or characteristics as implemented by the selection signals 144.

In general, techniques for performing one or more the herein-disclosed operations associated with receiving a dynamically customized audio-visual content including an audio-visual core portion at least partially modified with at least one revised content portion in accordance with the at least one selection signal at 430 may include generally-known techniques, as described more fully below. For example, in some implementation, the operations associated with receiving a dynamically customized audio-visual content including an audio-visual core portion at least partially modified with at least one revised content portion in accordance with the at least one selection signal at 430 may include one or more techniques disclosed, for example, in U.S. Pat. No. 8,059,201 issued to Aarts et al. (disclosing techniques for real-time and non-real-time rendering of video data streams), U.S. Pat. No. 8,016,653 issued to Pendleton et al. (disclosing techniques for three dimensional rendering of live events), U.S. Pat. Nos. 7,945,926 and 7,631,327 issued to Dempski et al. (disclosing techniques for video animation and merging with television broadcasts and supplemental content sources), U.S. Pat. No. 7,109,993 and U.S. Patent Publication No. 20070165022 by Peleg et al. (disclosing generating a head model and modifying portions of facial features), U.S. Pat. No. 6,054,999 issued to Strandberg (disclosing producing graphic movement sequences from recordings of measured data from strategic parts of actors), U.S. Pat. No. 5,926,575 issued to Ohzeki et al. (disclosing techniques for image deformation or distortion based on correspondence to a reference image, wire-frame modeling of images and texture mapping), U.S. Pat. No. 5,623,587 issued to Bulman (disclosing techniques for creation of composite electronic images from multiple individual images), U.S. Pat. No. 5,111,409 issued to Gasper et al. (disclosing techniques for synchronization of synthesized actors), U.S. Pat. Nos. 4,884,972 and 4,884,972 issued to Gasper (disclosing techniques for synchronization of animated objects), U.S. Pat. Nos. 4,827,532 and 4,600,281 and 4,260,229 issued to Bloomstein (disclosing techniques for substitution of sound track language and corresponding lip movements), U.S. Pat. No. 4,569,026 issued to Best (disclosing techniques for interactive entertainment systems), U.S. Patent Publication No. 20040181592 by Samra et al. (disclosing techniques for annotating and versioning digital media), and U.S. Patent Publication No. 20110029099 by Benson (disclosing techniques for providing audio visual content), which patents and pending applications are incorporated herein by reference.

Figure 5A:
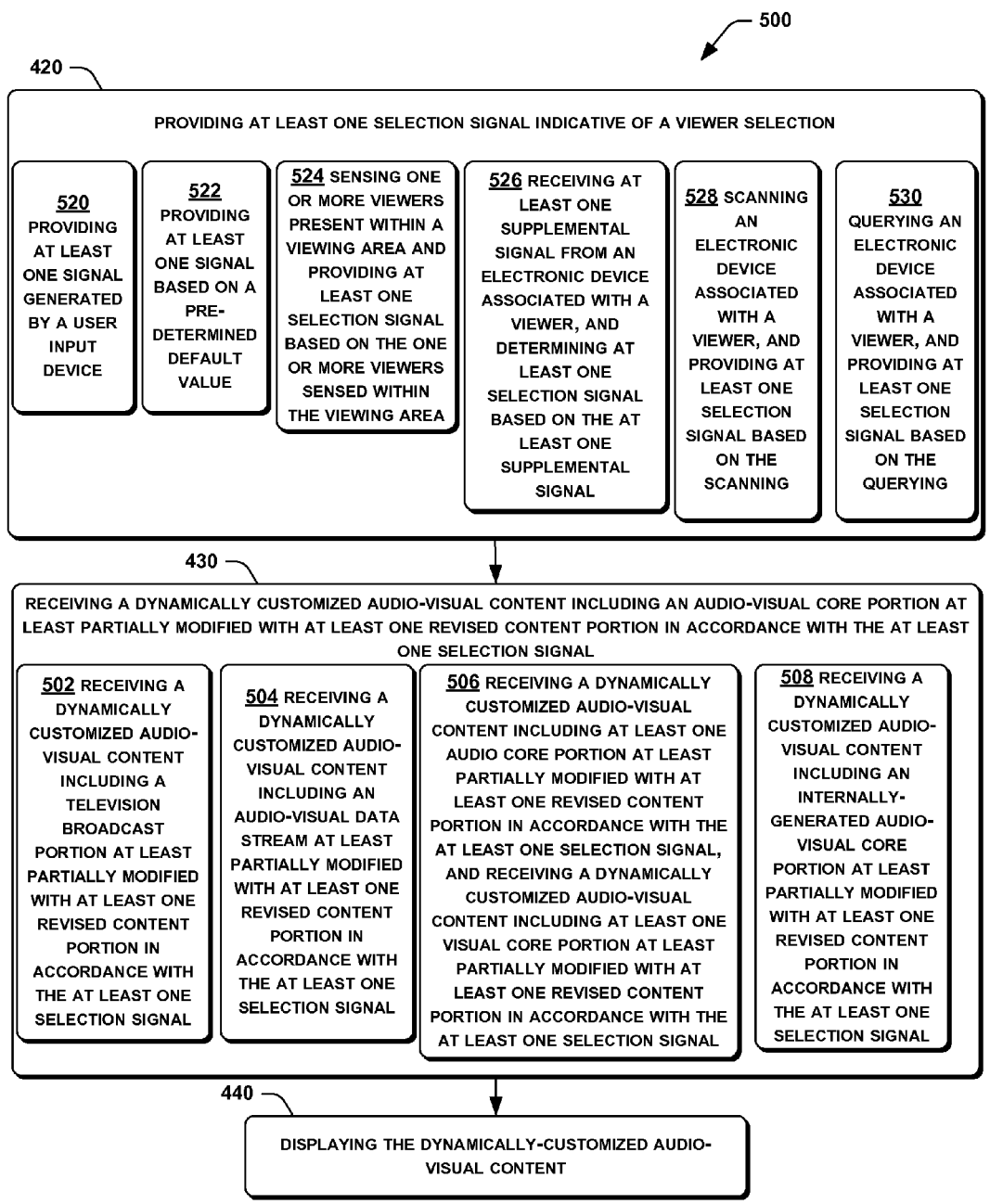

As shown in FIG. 5A, in some implementations, receiving a dynamically customized audio-visual content including an audio-visual core portion at least partially modified with at least one revised content portion in accordance with the at least one selection signal at 430 may include receiving a dynamically customized audio-visual content including a television broadcast portion at least partially modified with at least one revised content portion in accordance with the at least one selection signal at 502 (e.g. conventional wireless television broadcast, cable television broadcast, satellite television broadcast, etc.). In further implementations, receiving a dynamically customized audio-visual content including an audio-visual core portion at least partially modified with at least one revised content portion in accordance with the at least one selection signal at 430 may include receiving a dynamically customized audio-visual content including an audio-visual data stream at least partially modified with at least one revised content portion in accordance with the at least one selection signal at 504 (e.g. streaming audio-visual content via Internet, audio-visual data stream via LAN, etc.). In still further implementations, receiving a dynamically customized audio-visual content including an audio-visual core portion at least partially modified with at least one revised content portion in accordance with the at least one selection signal at 430 may include receiving a dynamically customized audio-visual content including at least one audio core portion at least partially modified with at least one revised content portion in accordance with the at least one selection signal and receiving a dynamically customized audio-visual content including at least one visual core portion at least partially modified with at least one revised content portion in accordance with the at least one selection signal at 506 (e.g. receiving a modified audio signal via a wireless connection and receiving a modified video data stream via a cable or vice versa, receiving a modified audio signal via a first wireless connection and receiving a modified video signal via a second wireless connection, etc.). In still further embodiments, receiving a dynamically customized audio-visual content including an audio-visual core portion at least partially modified with at least one revised content portion in accordance with the at least one selection signal at 430 may include receiving a dynamically customized audio-visual content including an internally-generated audio-visual core portion at least partially modified with at least one revised content portion in accordance with the at least one selection signal at 508 (e.g. receiving a modified audio-visual core portion from an internal media player, generating a modified audio-visual core portion using an internally-executing software routine, etc.).

As further shown in FIG. 5A, a variety of different selection signals may be provided in accordance with the present disclosure. For example, in some implementations, providing at least one selection signal indicative of a preference at 420 may include providing at least one selection signal generated by a user input device at 520 (e.g. providing a signal generated by a keyboard, a joystick, a microphone, a touch screen, etc.). In further implementations, providing at least one selection signal indicative of a preference at 420 may include providing at least one selection signal based on a pre-determined default value at 522 (e.g. providing one or more signals based on a user's previous selections stored in memory, or a pre-defined profile for a user stored in memory, etc.).

In other implementations, providing at least one selection signal indicative of a preference at 420 may include sensing one or more viewers present within a viewing area and providing at least one selection signal based on at least some of the one or more viewers sensed within the viewing area at 524 (e.g. sensing a parent and a child within a television viewing area, and providing a first selection signal based on the parent and a second selection signal based on the child, or sensing a female and a male within a television viewing area, and providing a first selection signal based on the female and a second selection signal based on the male, etc.).

In still other implementations, providing at least one selection signal indicative of a preference at 420 may include receiving at least one supplemental signal from an electronic device associated with a viewer (e.g. a cell phone, personal data assistant, laptop computer, desktop computer, smart phone, tablet, Apple iPhone, Apple iPad, Microsoft Surface, Kindle Fire, etc.) and providing at least one selection signal based on the at least one supplemental signal at 526. In other implementations, providing at least one selection signal indicative of a preference at 420 may include scanning an electronic device associated with a viewer (e.g. a cell phone, personal data assistant, laptop computer, desktop computer, smart phone, tablet, Apple iPhone®, Apple iPad®, Microsoft Surface®, Kindle Fire®, etc.) and providing at least one selection signal based on the scanning at 528. And in other implementations, providing at least one selection signal indicative of a preference at 420 may include querying an electronic device associated with a viewer (e.g. a cell phone, personal data assistant, laptop computer, desktop computer, smart phone, tablet, Apple iPhone®, Apple iPad®, Microsoft Surface®, Kindle Fire®, etc.) and providing at least one selection signal based on the querying at 530.

Figure 5B:
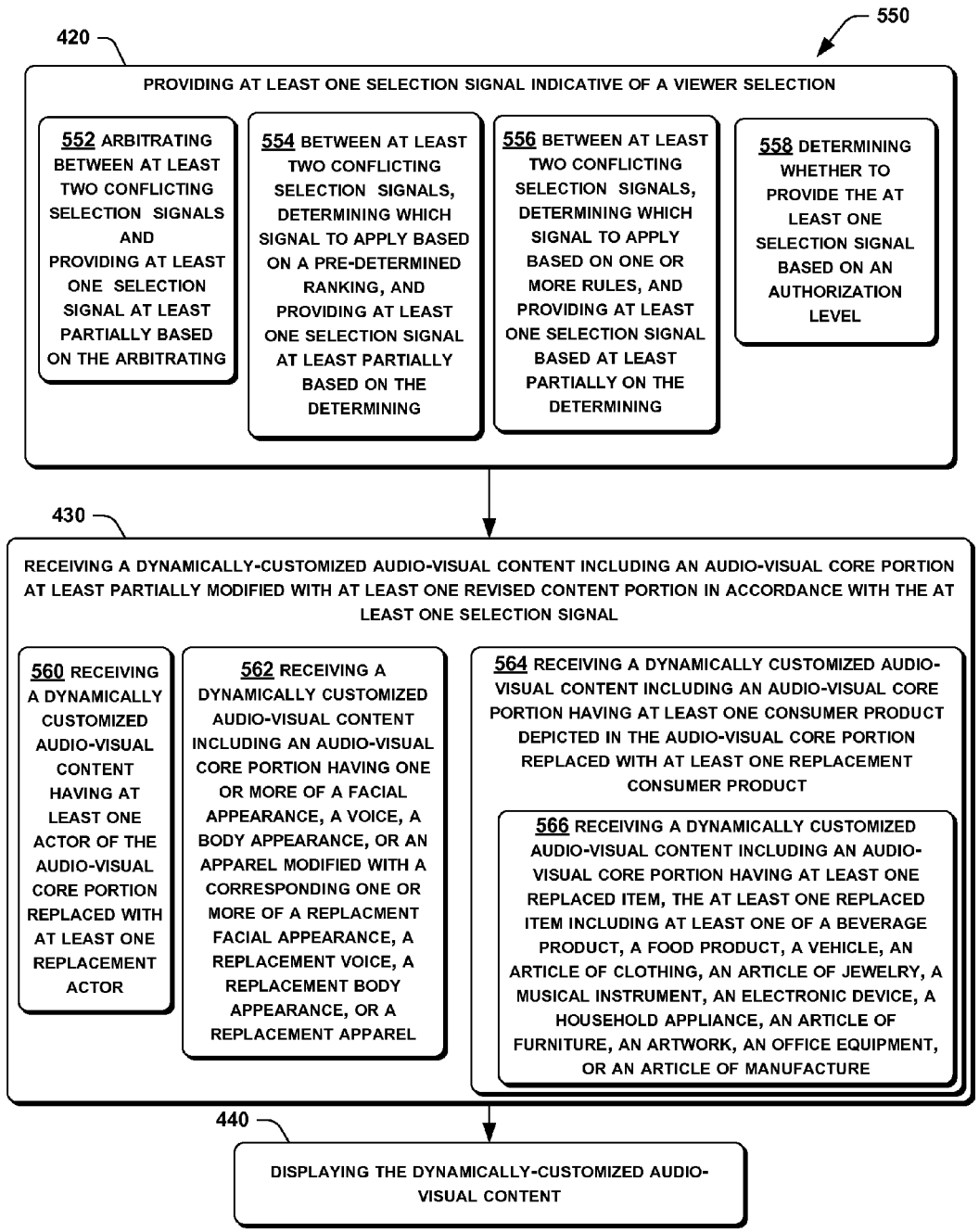

In some instances, one or more incoming signals may conflict with one or more other incoming signals. Such conflicts may be resolved in a variety of suitable ways. For example, as shown in FIG. 5B, in some implementations, providing at least one selection signal indicative of a preference at 420 may include arbitrating between at least two conflicting selection signals and providing at least one selection signal at least partially based on the arbitrating at 552 (e.g. arbitrating between a first selection signal indicating a desire to view R-rated subject matter, and a second selection signal indicating that a child is in the viewing area, and providing a selection signal such that the R-rated subject matter is not shown). In at least some implementations, providing at least one selection signal indicative of a preference at 420 may include between at least two conflicting selection signals, determining which selection signal to provide based on a pre-determined ranking, and providing at least one selection signal at least partially based on the determining at 554 (e.g. between a first selection signal from a manual input device indicating a preference to view a movie in English and a second selection signal from a scanning of a laptop computer indicating a preference for French, and determining to apply the first selection signal based on a pre-determined ranking that gives higher ranking to manually input signals over signals determined by scanning, and providing the first selection signal based on the determining; between a first selection signal from a parent's electronic device and a second selection signal from a child's electronic device, determining to apply the first selection signal based on a ranking that gives priority to signals from the parent's electronic device over the child's electronic device, and providing the first selection signal based on the determining, etc.).

In further implementations, providing at least one selection signal indicative of a preference at 420 may include between at least two conflicting selection signals, determining which signal to apply based on one or more rules, and providing at least one selection signal at least partially based on the determining at 556 (e.g. between a first selection signal from a manual input device indicating a desire to view R-rated content, and a second selection signal from a scanning of a viewing area indicating a child in a viewing area, determining not to display the R-rated content based on a rule that indicates that R-rated content will not be displayed when any child is present, and providing the selection signal not to display the R-rated content based on the determining; between a first selection signal from a manual input device indicating a desire to view a first actor, and a second selection signal from an Android phone indicating a desire to view a second actor, determining to apply the first selection signal based on a rule that gives priority to a manual input over an input determined from querying an electronic device, and providing the selection signal based on the determining etc.). In still other implementations, providing at least one selection signal indicative of a preference at 420 may include determining whether to provide the at least one selection signal based on an authorization level at 558 (e.g. determining not to display an R-rated content based on a lack of authorization by an owner of an electronic device).

As noted above, a wide variety of aspects of audio-visual core portions may be dynamically customized in accordance with the preferences of a viewer. For example, as shown in FIG. 5B, in at least some implementations, receiving a dynamically customized audio-visual content including an audio-visual core portion at least partially modified with at least one revised content portion in accordance with the at least one selection signal at 430 may include receiving a dynamically customized audio-visual content having at least one actor of the audio-visual core portion replaced with at least one replacement actor (e.g. receiving a dynamically-customized movie having the actor Brad Pitt in the movie Troy replaced with replacement actor Mel Gibson, receiving a dynamically-customized podcast having the actor Meryl Streep in the movie The Manchurian Candidate replaced with replacement actor Jessica Alba, the term "actor" being used herein a gender-neutral manner to include both males and females, etc.) at 560.

In further implementations, receiving a dynamically customized audio-visual content including an audio-visual core portion at least partially modified with at least one revised content portion in accordance with the at least one selection signal at 430 may include receiving a dynamically customized audio-visual content including an audio-visual core portion having one or more of a facial appearance, a voice, a body appearance, or an apparel modified with a corresponding one or more of a replacement facial appearance, a replacement voice, a replacement body appearance, or a replacement apparel (e.g. receiving a dynamically-customized moving having a facial appearance and a voice of the actor Brad Pitt in the movie Troy modified with a replacement facial appearance of actor Mel Gibson and a replacement voice of actor Chris Rock, or receiving a dynamically-customized data stream having a body appearance and an apparel of actor Meryl Streep in the movie The Manchurian Candidate modified with a replacement body appearance of actor Jessica Alba and a replacement apparel based on a browsing history of online clothing shopping recently viewed by the viewer as indicated by supplemental signals from the viewer's laptop computer, etc.) at 562.

As further shown in FIG. 5B, in still other implementations, receiving a dynamically customized audio-visual content including an audio-visual core portion at least partially modified with at least one revised content portion in accordance with the at least one selection signal at 430 may include receiving a dynamically customized audio-visual content including an audio-visual core portion having at least one consumer product depicted in the audio-visual core portion replaced with at least one replacement consumer product (e.g. receiving a dynamically customized television broadcast having a can of Coke® held by an actor in a television sitcom replaced with a can of Dr. Pepper®, receiving a dynamically customized television broadcast having a hamburger eaten by a character in a movie replaced with a taco, receiving a dynamically customized podcast having a Gibson® guitar played by a character in the podcast replaced with a Fender® guitar, etc.) at 564. In further implementations, receiving a dynamically customized audio-visual content including an audio-visual core portion having at least one consumer product depicted in the audio-visual core portion replaced with at least one replacement consumer product at 564 may include receiving a dynamically customized audio-visual content including an audio-visual core portion having at least one replaced item, the at least one replaced item including at least one of a beverage product, a food product, a vehicle, an article of clothing, an article of jewelry, a musical instrument, an electronic device, a household appliance, an article of furniture, an artwork, an office equipment, or an article of manufacture at 566.

Figure 6:
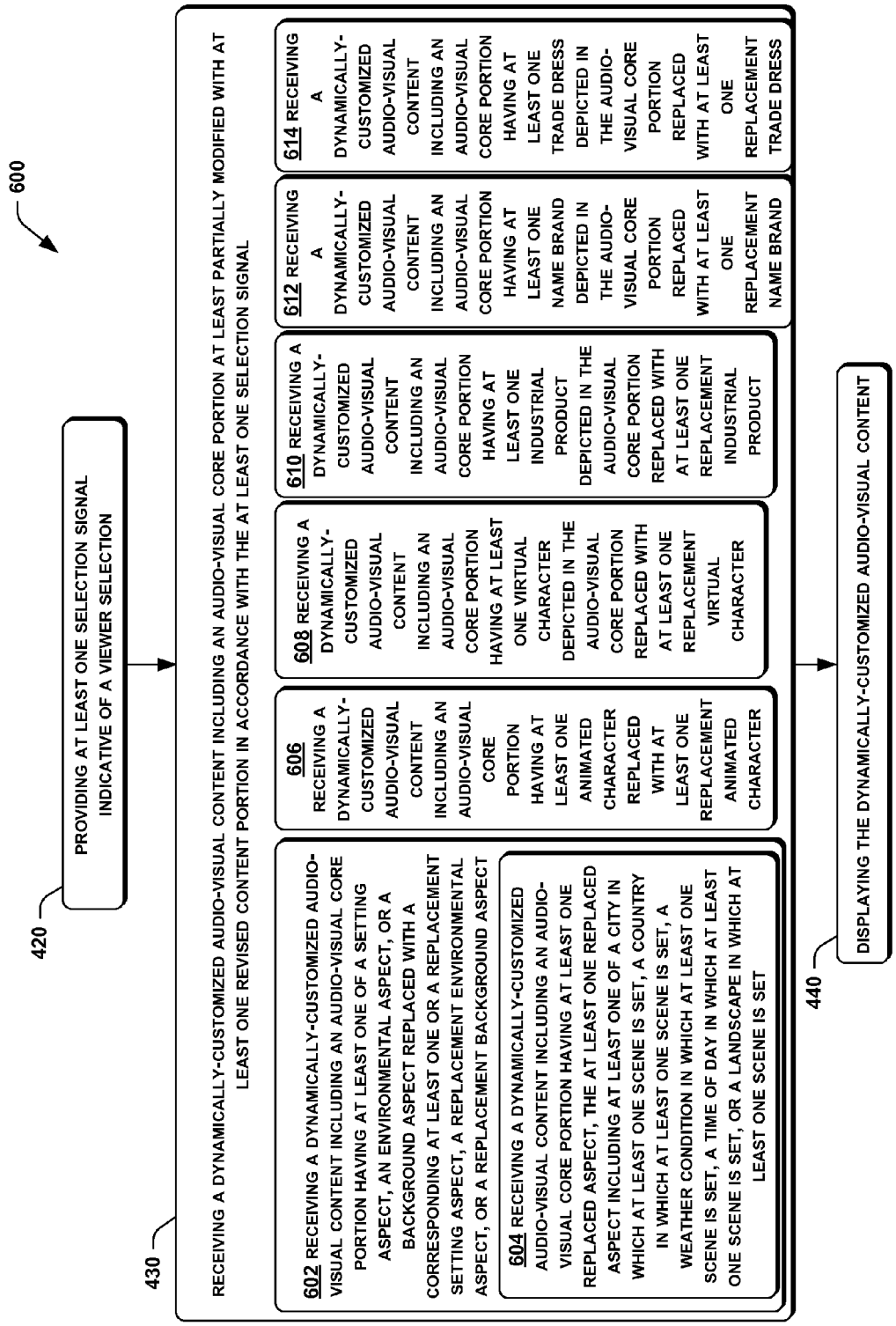

Referring now to FIG. 6, in additional implementations, receiving a dynamically customized audio-visual content including an audio-visual core portion at least partially modified with at least one revised content portion in accordance with the at least one selection signal at 430 may include receiving a dynamically customized audio-visual content including an audio-visual core portion having at least one replaced aspect, the at least one replaced aspect including at least one of a setting aspect, an environmental aspect, or a background aspect at 602. For example, one or more scenes from a movie may be set in a different location (e.g. scenes from Sleepless in Seattle may be set in Cleveland, or a background with the Golden Gate bridge may be replaced with the Tower Bridge over the Thames River, etc.). Alternately, a weather condition may be replaced with a different weather condition (e.g. a surfing scene from Baywatch may take place in a snowstorm instead of a sunny day, etc.), or buildings in a background may be replaced with mountains or open countryside.

In some implementations, receiving a dynamically customized audio-visual content including an audio-visual core portion having at least one replaced aspect, the at least one replaced aspect including at least one of a setting aspect, an environmental aspect, or a background aspect at 602 may include receiving a dynamically customized audio-visual content including an audio-visual core portion having at least one replaced aspect, the at least one replaced aspect including at least one of a city in which at least one scene is set, a country in which at least one scene is set, a weather condition in which at least one scene is set, a time of day in which at least one scene is set, or a landscape in which at least one scene is set at 604.

As further shown in FIG. 6, in other implementations, receiving a dynamically customized audio-visual content including an audio-visual core portion at least partially modified with at least one revised content portion in accordance with the at least one selection signal at 430 may include receiving a dynamically customized audio-visual content including an audio-visual core portion having at least one animated character replaced with at least one replacement animated character at 606 (e.g. receiving a cartoon having Snow White from Snow White and the Seven Dwarfs replaced with a cartoon Alice from Alice in Wonderland, or receiving an animated clip having an animated elf replaced with an animated dwarf, etc.). In further implementations, receiving a dynamically customized audio-visual content including an audio-visual core portion at least partially modified with at least one revised content portion in accordance with the at least one selection signal at 430 may include receiving a dynamically customized audio-visual content including an audio-visual core portion having at least one virtual character replaced with at least one replacement virtual character at 608 (e.g. receiving a clip having a virtual warrior replaced with a virtual wizard, etc.).

In still other implementations, receiving a dynamically customized audio-visual content including an audio-visual core portion at least partially modified with at least one revised content portion in accordance with the at least one selection signal at 430 may include receiving a dynamically customized audio-visual content including an audio-visual core portion having at least one industrial product depicted in the audio-visual core portion replaced with at least one replacement industrial product at 610 (e.g. receiving a television broadcast having a nameplate on a milling machine changed from "Cincinnati" to "Bridgeport" in a factory scene, receiving a telecast having a name of a shipping line and/or the colors on a container ship changed from "Maersk" to "Evergreen," etc.).

In further implementations, receiving a dynamically customized audio-visual content including an audio-visual core portion at least partially modified with at least one revised content portion in accordance with the at least one selection signal at 430 may include receiving a dynamically customized audio-visual content including an audio-visual core portion having at least one name brand depicted in the audio-visual core portion replaced with at least one replacement name brand at 612 (e.g. receiving an advertisement having a leather label on character's pants changed from "Levis" to "J Brand," or receiving a cable television signal having an Izod alligator on a character's shirt replaced with a Ralph Lauren horse logo, or receiving a cable television signal having a shoe logo from "Gucci" changed to "Calvin Klein," etc.).

In yet other implementations, receiving a dynamically customized audio-visual content including an audio-visual core portion at least partially modified with at least one revised content portion in accordance with the at least one selection signal at 430 may include receiving a dynamically customized audio-visual content including an audio-visual core portion having at least one trade dress depicted in the audio-visual core portion replaced with at least one replacement trade dress at 614 (e.g. receiving a sports broadcast having uniforms, packaging, colors, signs, logos, and any other items associated with a trade dress of "McDonald's" restaurant replaced with corresponding trade dress items associated with "Burger King" restaurant, receiving a news broadcast having brown trucks and uniforms associated with the "UPS" delivery company replaced with red and yellow trucks and uniforms associated with the "DHL Express" delivery company, receiving a sports broadcast having helmets and jerseys associated with the Minnesota Vikings replaced with replacement helmets and jerseys associated with the Seattle Seahawks, etc.).

Figure 7A:
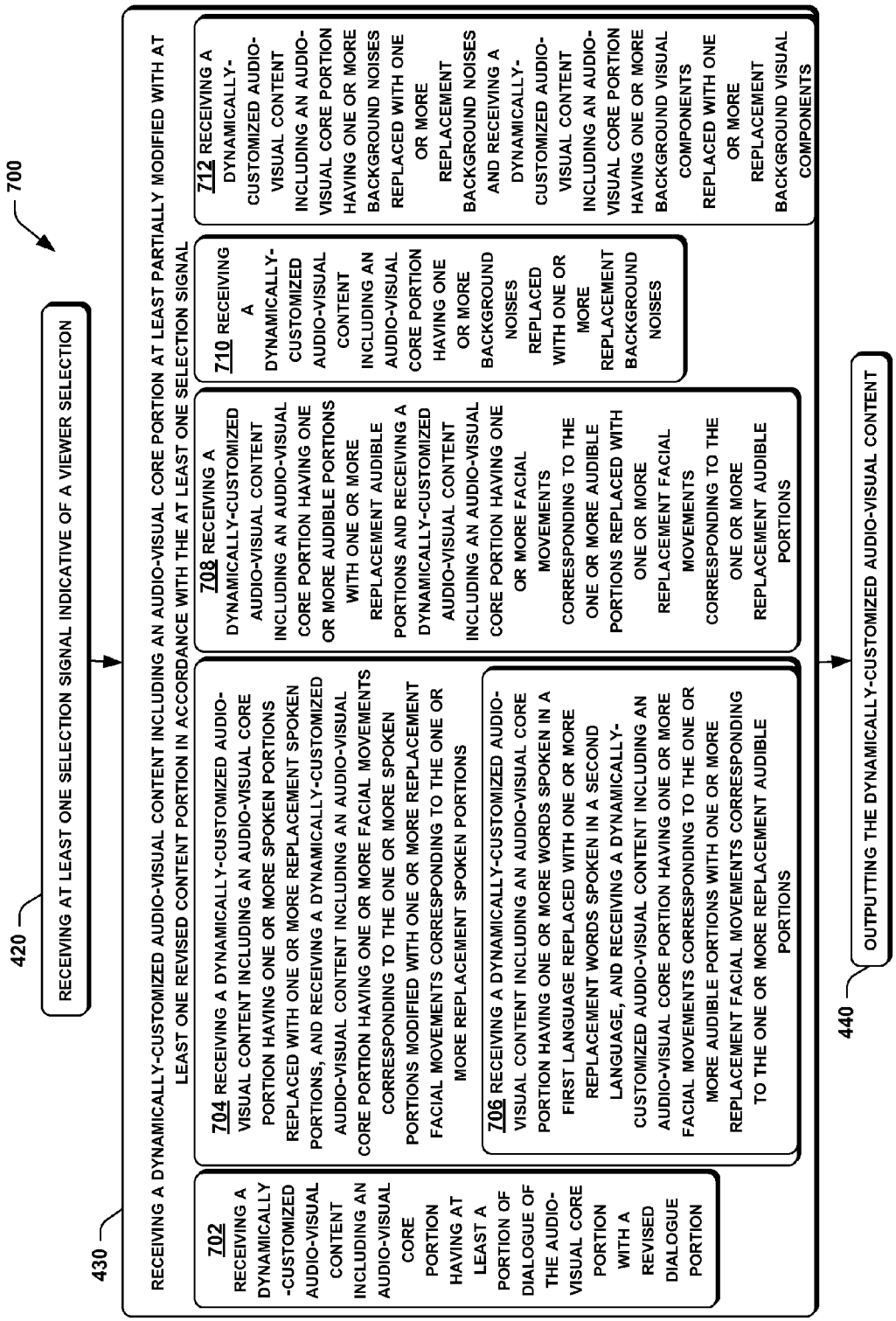

FIG. 7A shows additional alternative implementations of processes in accordance with the teachings of the present disclosure. For example, in additional implementations, receiving a dynamically customized audio-visual content including an audio-visual core portion at least partially modified with at least one revised content portion in accordance with the at least one selection signal at 430 may include receiving a dynamically customized audio-visual content including an audio-visual core portion having at least a portion of dialogue of the audio-visual core portion replaced with a revised dialogue portion at 702. For example, based on the at least one selection signal indicative of a viewer selection (e.g. a viewer selection indicating a desire for no profanity, or based on automatic detection using a sensor of a child entering a viewing area, etc.) at 420, a portion of dialogue of a movie that contains profanity or that may otherwise be offensive to the viewer may be replaced with a replacement portion of dialogue that is not offensive to the viewer (e.g. a dialogue of a movie is modified from an R-rated dialogue to a lower-rated dialogue, such as PG-13-rated dialogue or a G-rated dialogue, such as "Frankly, my dear, I don't give a damn" being replaced with "Frankly, my dear, I don't really care", a dialogue that is threatening or violent may be replaced with a less-threatening or less-violent dialogue, etc.).

In some implementations, receiving a dynamically customized audio-visual content including an audio-visual core portion at least partially modified with at least one revised content portion in accordance with the at least one selection signal at 430 may include receiving a dynamically customized audio-visual content including an audio-visual core portion having one or more spoken portions replaced with one or more replacement spoken portions (e.g. receiving a dynamically-customized content having a profane word, such as "damn," replaced with a non-profane word, such as "darn," or having a first laughter, such as a "tee hee hee," replaced with a second laugher, such as a "ha ha ha," etc.) and receiving a dynamically customized audio-visual content including an audio-visual core portion having one or more facial movements corresponding to the one or more spoken portions modified with one or more replacement facial movements corresponding to the one or more replacement spoken portions (e.g. receiving a dynamically-customized content having one or more lip movements corresponding with the profane word replaced with one or more replacement lip movements corresponding with the non-profane word, or having lip and eye movements corresponding with the first laughter replaced with replacement lip and eye movements corresponding with the second laughter, etc.) at 704. Accordingly, unlike conventional editing practices that change spoken words but leave facial movements unchanged, in accordance with at least some implementations, by receiving dynamically-customized content having both the audible portions and the corresponding facial movements modified, it is not apparent to a viewer that any changes have been made to the dialogue of the audio-visual core portion. In other words, it will not be apparent to a viewer that the person on screen was saying one thing but the audience is hearing a different thing.

As further shown in FIG. 7A, in further implementations, receiving a dynamically customized audio-visual content including an audio-visual core portion having one or more spoken portions replaced with one or more replacement spoken portions and receiving a dynamically customized audio-visual content including an audio-visual core portion having one or more facial movements corresponding to the one or more spoken portions modified with one or more replacement facial movements corresponding to the one or more replacement spoken portions at 704 may include receiving a dynamically customized audio-visual content including an audio-visual core portion having one or more words spoken in a first language replaced with one or more replacement words spoken in a second language (e.g. receiving dynamically customized content having "no" replaced with "nyet," or receiving dynamically customized content having "yes" replaced with "oui," etc.), and receiving a dynamically customized audio-visual content including an audio-visual core portion having one or more facial movements corresponding to the one or more words spoken in the first language modified with one or more replacement facial movements corresponding to the one or more words spoken in the second language (e.g. receiving a dynamically customized content having facial movements corresponding to "no" replaced with replacement facial movements corresponding to "nyet," or receiving a dynamically customized content having facial movements corresponding to "yes" replaced with replacement facial movements corresponding to "oui," etc.) at 706. Again, in this way, it will not be apparent to a viewer that an actor was originally speaking a first language but the movie has been dubbed with a second language, and instead, it will appear to the viewer that the actor was originally speaking the second language.

In further implementations, receiving a dynamically customized audio-visual content including an audio-visual core portion at least partially modified with at least one revised content portion in accordance with the at least one selection signal at 430 may include receiving a dynamically customized audio-visual content including an audio-visual core portion having one or more audible portions replaced with one or more replacement audible portions (e.g. receiving a dynamically customized content having a sound of a hand clap replaced with a sound of snapping fingers, or receiving a dynamically customized content having a sound of a cough replaced with a sound of a sneeze, or receiving a dynamically customized content having the sound of a piano replaced with the sound of a violin, etc.) and receiving a dynamically customized audio-visual content including an audio-visual core portion having one or more body movements corresponding to the one or more audible portions modified with one or more replacement body movements corresponding to the one or more replacement audible portions (e.g. receiving a dynamically customized content having two hands striking replaced with two fingers snapping, or receiving a dynamically customized content having facial movements associated with a cough replacement with facial movements associated with a sneeze, or receiving a dynamically customized content having visual components associated with a piano being played replaced with replacement visual components associated with a violin being played, etc.) at 708. Accordingly, by replacing both the audible and visual portions, it is not apparent to the viewer that any changes have been made to the audio-visual core portion.

In still other implementations, receiving a dynamically customized audio-visual content including an audio-visual core portion at least partially modified with at least one revised content portion in accordance with the at least one selection signal at 430 may include receiving a dynamically customized audio-visual content including an audio-visual core portion having one or more background noises replaced with one or more replacement background noises (e.g. receiving a dynamically customized content having a sound of a bird singing replaced with a sound of a dog barking, or receiving a dynamically customized content having a sound of an avalanche replaced with a sound of an erupting volcano, etc.) at 710.

In additional implementations, receiving a dynamically customized audio-visual content including an audio-visual core portion at least partially modified with at least one revised content portion in accordance with the at least one selection signal at 430 may include receiving a dynamically customized audio-visual content including an audio-visual core portion having one or more background noises replaced with one or more replacement background noises (e.g. receiving a dynamically customized content having a sound of a lion roaring replaced with a sound of an elephant trumpeting, or receiving a dynamically customized content having a sound of an avalanche replaced with a sound of an erupting volcano, etc.), and receiving a dynamically customized audio-visual content including an audio-visual core portion having one or more background visual components replaced with one or more replacement background visual components (e.g. receiving a dynamically customized content having a visual image of a lion roaring replaced with a visual image of an elephant trumpeting, or receiving a dynamically customized content having a visual depiction of an avalanche replaced with a visual depiction of an erupting volcano, etc.) at 712.

It will be appreciated that systems and methods in accordance with the present disclosure may be utilized to adjust content to accommodate cultural differences. In at least some implementations, content that is categorized as being culturally inappropriate (e.g. vulgar, offensive, racist, derogatory, degrading, stereotypical, distasteful, etc.) may be either omitted (or deleted or removed), or may be replaced with alternate content that is categorized as being culturally appropriate, such as by retrieving replacement content from a library of lookup tables, or any other suitable source. For example, as shown in FIG. 7B, in some implementations, receiving a dynamically customized audio-visual content including an audio-visual core portion at least partially modified with at least one revised content portion in accordance with the at least one selection signal at 430 may include receiving a dynamically customized audio-visual content including an audio-visual core portion having a culturally inappropriate portion at least one of replaced with a culturally appropriate portion or omitted at 752 (e.g. receiving a dynamically customized content having terminology that may be considered a racial slur in a particular culture replaced with replacement terminology that is not considered a racial slur in the particular culture, or receiving a dynamically customized content having a content portion that includes a hand gesture that is insulting to a particular culture omitted; etc.).

In other implementations, providing at least one selection signal indicative of a preference at 420 may include providing a selection signal indicative of a cultural heritage of at least one viewer at 754, and receiving a dynamically customized audio-visual content including an audio-visual core portion at least partially modified with at least one revised content portion in accordance with the at least one selection signal at 430 may include receiving a dynamically customized audio-visual content including an audio-visual core portion having a portion considered inappropriate with respect to the cultural heritage of the at least one viewer at least one of replaced with a replacement portion considered appropriate with respect to the cultural heritage of the at least one viewer, or omitted at 756 (e.g. receiving a signal indicating that a viewer is Chinese, and receiving a dynamically customized content having a reference to "Taiwan" replaced with a reference to "Chinese Taipei;" or receiving an indication that a viewer is Islamic, and receiving a dynamically customized content having a reference to the Bible replaced with a reference to the Quran; etc.).

Figure 7B:
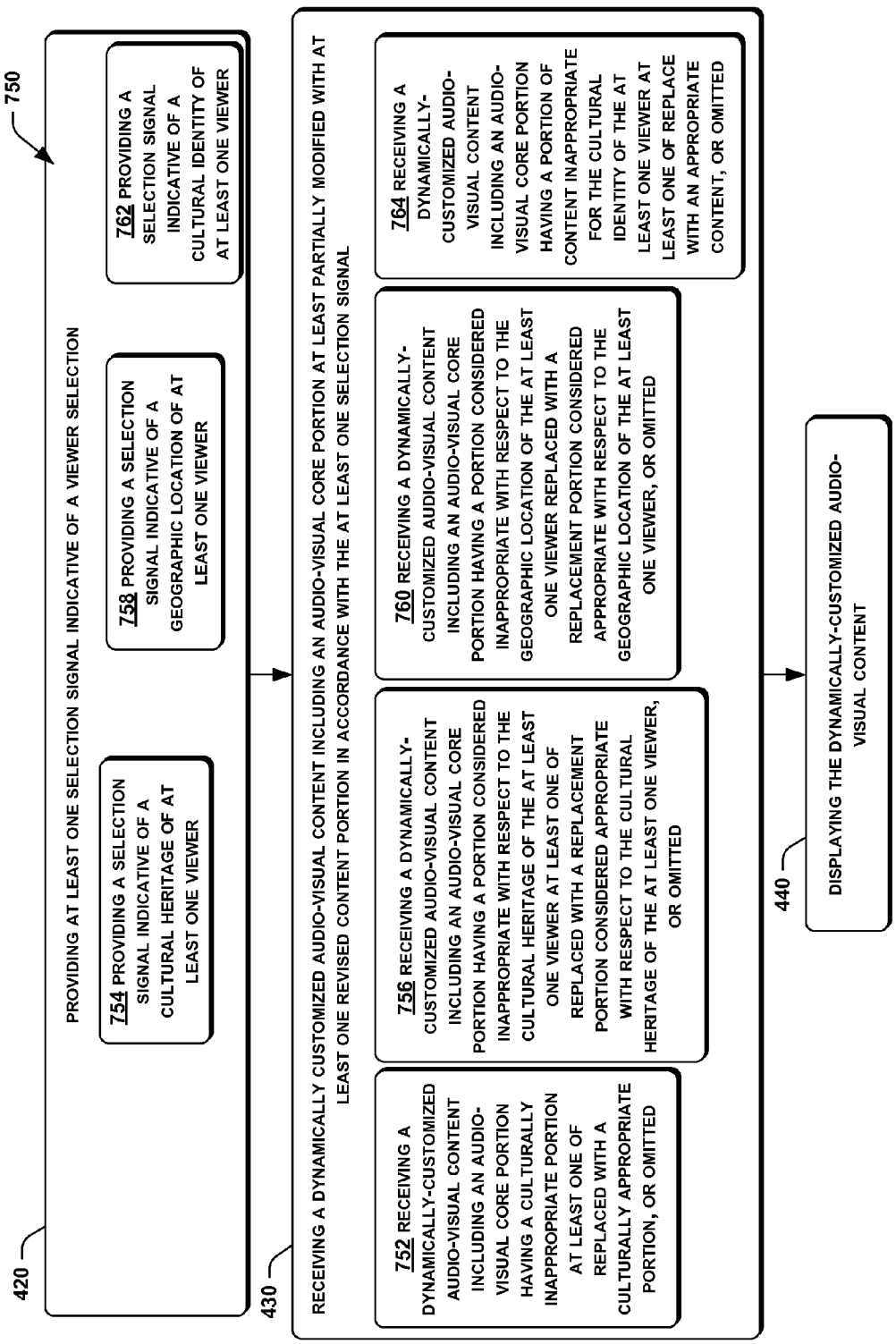

With continued reference to FIG. 7B, in further implementations, providing at least one selection signal indicative of a preference at 420 may include providing a selection signal indicative of a geographic location of at least one viewer at 758, and receiving a dynamically customized audio-visual content including an audio-visual core portion at least partially modified with at least one revised content portion in accordance with the at least one selection signal at 430 may include receiving a dynamically customized audio-visual content including an audio-visual core portion having a portion considered inappropriate with respect to the geographic location of the at least one viewer at least one of replaced with a replacement portion considered appropriate with respect to the geographic location of the at least one viewer, or omitted at 760 (e.g. receiving a signal, such as a GPS signal from a viewer's cell phone, indicating that the viewer is located in Brazil, and receiving a dynamically customized content having a content portion that includes a hand gesture that is offensive in Brazil, such as a Texas Longhorns "hook-em-horns" hand gesture, replaced with a benign hand gesture appropriate for the viewer located in Brazil; or receiving a signal, such as a location of an IP address of a local Internet service provider, that indicates that a viewer is located within a Native American reservation, and receiving a dynamically customized content having content that includes terminology offensive to Native Americans omitted; etc.).

And in other implementations, providing at least one selection signal indicative of a preference at 420 may include providing a selection signal indicative of a cultural identity of at least one viewer at 762, and receiving a dynamically customized audio-visual content including an audio-visual core portion at least partially modified with at least one revised content portion in accordance with the at least one selection signal at 430 may include receiving a dynamically customized audio-visual content including an audio-visual core portion having a portion of content inappropriate for the cultural identity of the at least one viewer at least one of replaced with an appropriate portion of content, or omitted at 764 (e.g. receiving a signal, such as a language selection of a software installed on a viewer's electronic device, indicating that the viewer is Arabic, and removing a content portion that is inappropriate to the Arabic culture; etc.).

It should be appreciated that receiving a dynamically customized audio-visual content including an audio-visual core portion at least partially modified with at least one revised content portion in accordance with the at least one selection signal may be accomplished in various ways. For example, as shown in FIG. 8, in some implementations, receiving a dynamically customized audio-visual content including an audio-visual core portion at least partially modified with at least one revised content portion in accordance with the at least one selection signal at 430 may include receiving a dynamically customized audio-visual content including an audio-visual core portion having at least one portion of a digital signal stream changed in accordance with the at least one selection signal (e.g. receiving a dynamically customized audio-visual content having original digitized signals of the audio-visual core portion replaced with replacement digitized signals of the audio-visual core portion, receiving a dynamically customized audio-visual content including an audio-visual core portion having original digitized signals of the audio-visual core portion supplemented with supplemental digitized signals, etc.) at 802.

In other implementations, receiving a dynamically customized audio-visual content including an audio-visual core portion at least partially modified with at least one revised content portion in accordance with the at least one selection signal at 430 may include receiving a dynamically customized audio-visual content including a digitized audio-visual core portion changed in accordance with the at least one selection signal at 804.

In further implementations, receiving a dynamically customized audio-visual content including an audio-visual core portion at least partially modified with at least one revised content portion in accordance with the at least one selection signal at 430 may include receiving a dynamically customized audio-visual content including at least a portion of an audio-visual core portion replaced with a view of a three dimensional model of a replacement portion in accordance with the at least one selection signal at 806. Thus, if the one or more selection signals 144 indicates that the user prefers to see a dynamically-customized movie (e.g. the movie Cleopatra) with a desired lead actress (or actor) (e.g. Angelina Joli) rather than an original lead actress (or actor) (e.g. Elizabeth Taylor), the processing component 110 may retrieve a digital model of the desired lead actress (or actor) and may substitute appropriate portions of the incoming core portion 102 with appropriate views of the digital model of the desired lead actress (or actor).

In still further implementations, receiving a dynamically customized audio-visual content including an audio-visual core portion at least partially modified with at least one revised content portion in accordance with the at least one selection signal at 430 may include receiving a dynamically customized audio-visual content having at least a portion of an audio-visual core portion rendered in accordance with the at least one selection signal at 808. In additional implementations, receiving a dynamically customized audio-visual content including an audio-visual core portion at least partially modified with at least one revised content portion in accordance with the at least one selection signal at 430 may include receiving a dynamically customized audio-visual content including at least a portion of an audio-visual core portion re-rendered in accordance with the at least one selection signal at 810. In additional implementations, receiving a dynamically customized audio-visual content including an audio-visual core portion at least partially modified with at least one revised content portion in accordance with the at least one selection signal at 430 may include receiving a dynamically customized audio-visual content including at least a replacement portion rendered in accordance with the at least one selection signal and combined with the audio-visual core portion at 812.

In alternate implementations, receiving a dynamically customized audio-visual content including an audio-visual core portion at least partially modified with at least one revised content portion in accordance with the at least one selection signal at 430 may include receiving a dynamically customized audio-visual content including at least a portion of an audio-visual core portion re-rendered in accordance with the at least one selection signal to create a replacement portion, the replacement portion being combined with the audio-visual core portion at 814.

With reference to FIG. 9, in some implementations, receiving a dynamically customized audio-visual content including an audio-visual core portion at least partially modified with at least one revised content portion in accordance with the at least one selection signal at 430 may include receiving a dynamically customized audio-visual content including a combination of a first rendered stream and a second rendered stream, the first rendered stream being formed of a first plurality of frames of video data and the second rendered stream being formed of a second plurality of frames of video data (e.g. receiving a dynamically customized audio-visual content including multiplexing first and second rendered streams) at 902. In at least some implementations, the operations at 902 may include, for example, one or more techniques disclosed in U.S. Pat. No. 8,059,201 issued to Aarts et al. (disclosing techniques for real-time and non-real-time rendering of video data streams), which patent is incorporated herein by reference.

In other implementations, receiving a dynamically customized audio-visual content including an audio-visual core portion at least partially modified with at least one revised content portion in accordance with the at least one selection signal at 430 may include receiving a dynamically customized audio-visual content including at least one object modeled using a wireframe model including a plurality of polygons, and having texture data applied to the plurality of polygons to provide a three-dimensional appearance to the wireframe model for display on a display device at 904. In at least some implementations, the operations at 904 may include, for example, one or more techniques disclosed in U.S. Pat. No. 8,016,653 issued to Pendleton et al. (disclosing techniques for three dimensional rendering of live events), which patent is incorporated herein by reference.

In still other implementations, receiving a dynamically customized audio-visual content including an audio-visual core portion at least partially modified with at least one revised content portion in accordance with the at least one selection signal at 430 may include receiving a dynamically customized audio-visual content including a combination of a rendered supplemental video stream combined with an unblocked portion of the audio-visual core portion at 906. In additional implementations, receiving a dynamically customized audio-visual content including an audio-visual core portion at least partially modified with at least one revised content portion in accordance with the at least one selection signal at 430 may include receiving into a display area outside a letterboxed portion a dynamically customized audio-visual content including a combination of a rendered supplemental video stream with at least an unblocked portion of the audio-visual core portion at 907. In at least some implementations, the operations at 906 and/or 907 may include, for example, one or more techniques disclosed in U.S. Pat. Nos. 7,945,926 and 7,631,327 issued to Dempski et al. (disclosing techniques for video animation and merging with television broadcasts and supplemental content sources), which patents are incorporated herein by reference.

With continued reference to FIG. 9, in further implementations, receiving a dynamically customized audio-visual content including an audio-visual core portion at least partially modified with at least one revised content portion in accordance with the at least one selection signal at 430 may include receiving a dynamically customized audio-visual content including at least one object having one or more characteristics replaced with one or more adopted characteristics from one or more selected pre-formed objects at 908. For example, the operations at 908 may, in at least some implementations, be accomplished by a dynamic customization system (e.g. system 160 of FIG. 1), and may include executing one or more instructions that create a three-dimensional (3D) model, or may involve operations similar to those commonly referred to as "drag and drop" in commercially-available software (e.g. Microsoft Visio, etc.) to select pre-formed objects from a series of graphical menus, databases, or other suitable storage structures, and may also include a capability for alteration, modification, or individualization by a viewer. In particular implementations, the "adopting" operations at 908 may include one or more of reusing operations, copying operations, grafting operations, re-skinning operations, illuminating operations, or any other suitable operations. In at least some implementations, the operations at 908 may include, for example, one or more techniques disclosed in U.S. Pat. No. 7,109,993 and U.S. Patent Publication No. 20070165022 by Peleg et al. (disclosing generating a head model and modifying portions of facial features), which patent and pending application are incorporated herein by reference.

In additional implementations, receiving a dynamically customized audio-visual content including an audio-visual core portion at least partially modified with at least one revised content portion in accordance with the at least one selection signal at 430 may include receiving a dynamically customized audio-visual content including at least one object having at least one section at least one of replaced, adjusted, moved, or modified in accordance with a stored information, the stored information being determined at least partially based on the at least one selection signal at 910. In at least some implementations, the operations at 910 may include, for example, one or more techniques disclosed in U.S. Pat. No. 6,054,999 issued to Strandberg (disclosing producing graphic movement sequences from recordings of measured data from strategic parts of actors), which patent is incorporated herein by reference.

Figure 10:
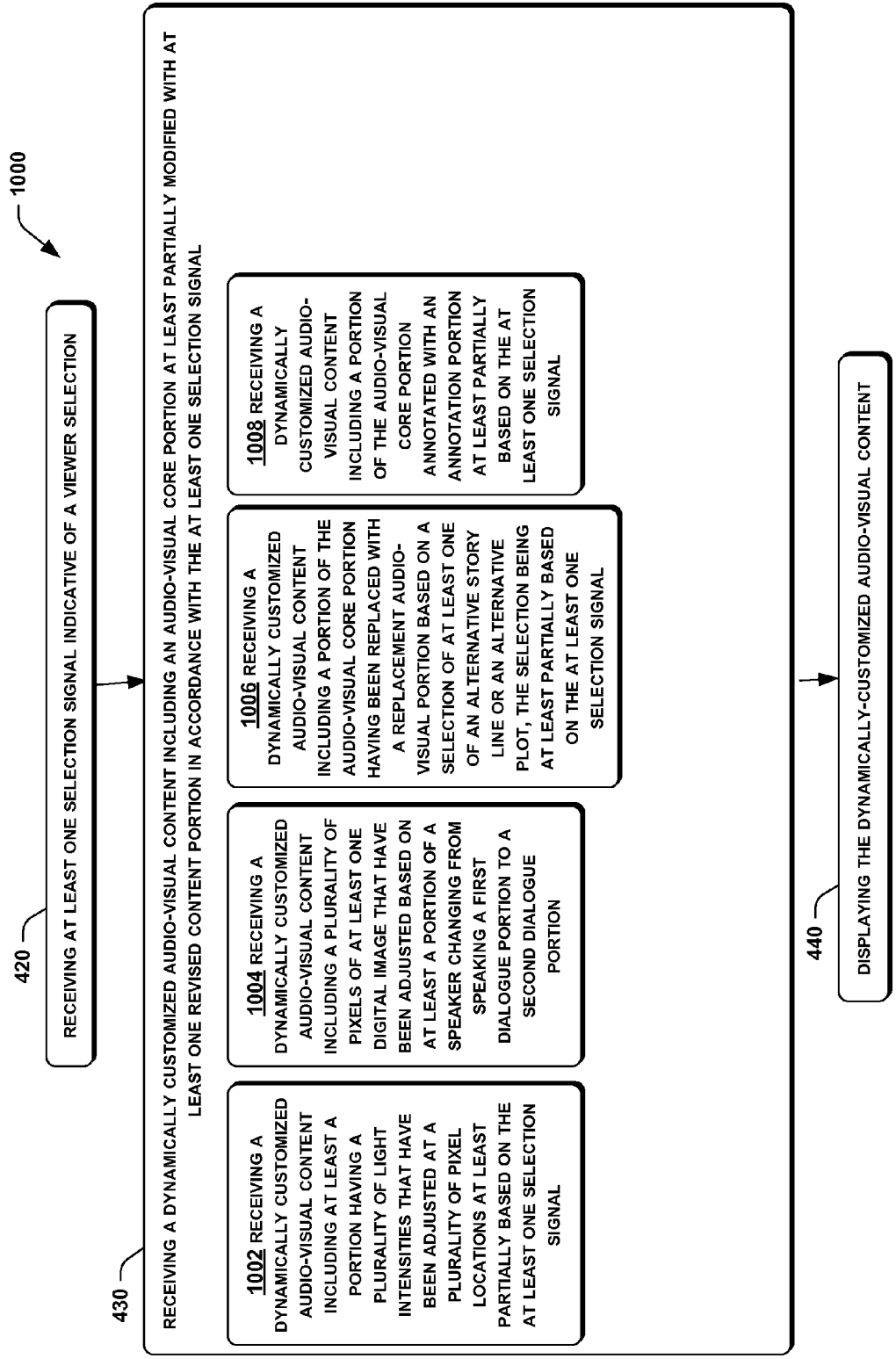

As shown in FIG. 10, in other implementations, receiving a dynamically customized audio-visual content including an audio-visual core portion at least partially modified with at least one revised content portion in accordance with the at least one selection signal at 430 may include may include receiving a dynamically customized audio-visual content including at least a portion having a plurality of light intensities that have been adjusted at a plurality of pixel locations at least partially based on the at least one selection signal at 1002. In further implementations, receiving a dynamically customized audio-visual content including an audio-visual core portion at least partially modified with at least one revised content portion in accordance with the at least one selection signal at 430 may include receiving a dynamically customized audio-visual content including a plurality of pixels of at least one digital image that have been adjusted based on at least a portion of a speaker changing from speaking a first dialogue portion to a second dialogue portion at 1004. In at least some implementations, the operations at 1102 and 1104 may include, for example, one or more techniques disclosed in U.S. Pat. Nos. 4,827,532 and 4,600,281 and 4,260,229 issued to Bloomstein (disclosing techniques for substitution of sound track language and corresponding lip movements), which patents are incorporated herein by reference.

In further implementations, receiving a dynamically customized audio-visual content including an audio-visual core portion at least partially modified with at least one revised content portion in accordance with the at least one selection signal at 430 may include receiving a dynamically customized audio-visual content including a portion of the audio-visual core portion having been replaced with a replacement audio-visual portion based on a selection of at least one of an alternative story line or an alternative plot, the selection being at least partially based on the at least one selection signal at 1006. In at least some implementations, the operations at 1106 may include, for example, one or more techniques disclosed in U.S. Pat. No. 4,569,026 issued to Best (disclosing techniques for interactive entertainment systems), which patent is incorporated herein by reference.

In still further implementations, receiving a dynamically customized audio-visual content including an audio-visual core portion at least partially modified with at least one revised content portion in accordance with the at least one selection signal at 430 may include receiving a dynamically customized audio-visual content including a portion of the audio-visual core portion annotated with an annotation portion at least partially based on the at least one selection signal at 1008. In at least some implementations, the operations at 1108 may include, for example, one or more techniques disclosed in U.S. Patent Publication No. 20040181592 by Samra et al. (disclosing techniques for annotating and versioning digital media), which pending patent application is incorporated herein by reference.

Figure 11:
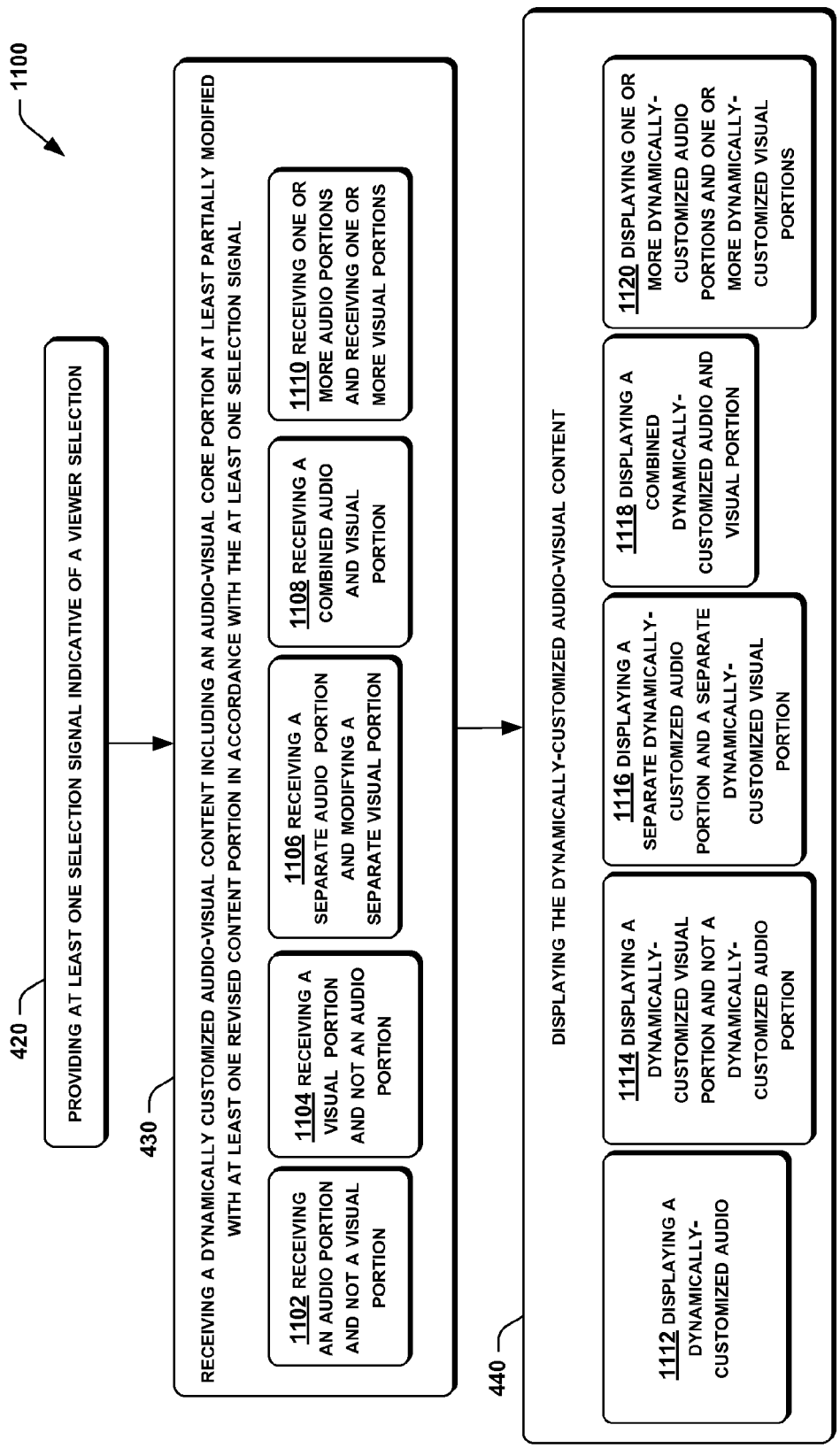

FIG. 11 shows a flowchart of a process 1100 for dynamic-customization of audio-visual content in accordance with another implementation of the present disclosure. In this implementation, the process 1100 includes providing at least one selection signal indicative of a preference at 420, receiving a dynamically customized audio-visual content including an audio-visual core portion at least partially modified with at least one revised content portion in accordance with the at least one selection signal at 430, and displaying the dynamically-customized audio-visual content at 440.

As further shown in FIG. 11, receiving a dynamically customized audio-visual content including an audio-visual core portion at least partially modified with at least one revised content portion in accordance with the at least one selection signal at 430 may involve a variety of different ways and aspects. For example, in some implementations, receiving a dynamically customized audio-visual content including an audio-visual core portion at least partially modified with at least one revised content portion in accordance with the at least one selection signal at 430 may include receiving an audio portion and not a visual portion at 1102. In other implementations, receiving a dynamically customized audio-visual content including an audio-visual core portion at least partially modified with at least one revised content portion in accordance with the at least one selection signal at 430 may include receiving a visual portion and not an audio portion at 1204. In still other implementations, receiving a dynamically customized audio-visual content including an audio-visual core portion at least partially modified with at least one revised content portion in accordance with the at least one selection signal at 430 may include receiving a separate audio portion and a separate visual portion at 1206. In further implementations, receiving a dynamically customized audio-visual content including an audio-visual core portion at least partially modified with at least one revised content portion in accordance with the at least one selection signal at 430 may include receiving a combined audio and visual portion at 1208. In additional implementations, receiving a dynamically customized audio-visual content including an audio-visual core portion at least partially modified with at least one revised content portion in accordance with the at least one selection signal at 430 may include receiving one or more audio portions and one or more visual portions at 1210 (e.g. receiving a plurality of audio portions and a single video portion, receiving a single audio portion and a plurality of video portions, etc.).

With continued reference to FIG. 11, displaying the dynamically-customized audio-visual content at 440 may involve a variety of different ways and aspects. For example, in some implementations, displaying the dynamically-customized audio-visual content at 440 may include displaying a dynamically-customized audio at 1112. In other implementations, displaying the dynamically-customized audio-visual content at 440 may include displaying a dynamically-customized visual portion and not a dynamically-customized audio portion at 1114. In still other implementations, displaying the dynamically-customized audio-visual content at 440 may include displaying a separate dynamically-customized audio portion and a separate dynamically-customized visual portion at 1116. In further implementations, displaying the dynamically-customized audio-visual content at 440 may include displaying a combined dynamically-customized audio and visual portion at 1118. In additional implementations, displaying the dynamically-customized audio-visual content at 440 may include displaying one or more dynamically-customized audio portions and one or more dynamically-customized visual portions at 1120 (e.g. outputting a plurality of audio portions and outputting a single video portion, outputting a single audio portion and outputting a plurality of video portions, etc.).

Figure 12:
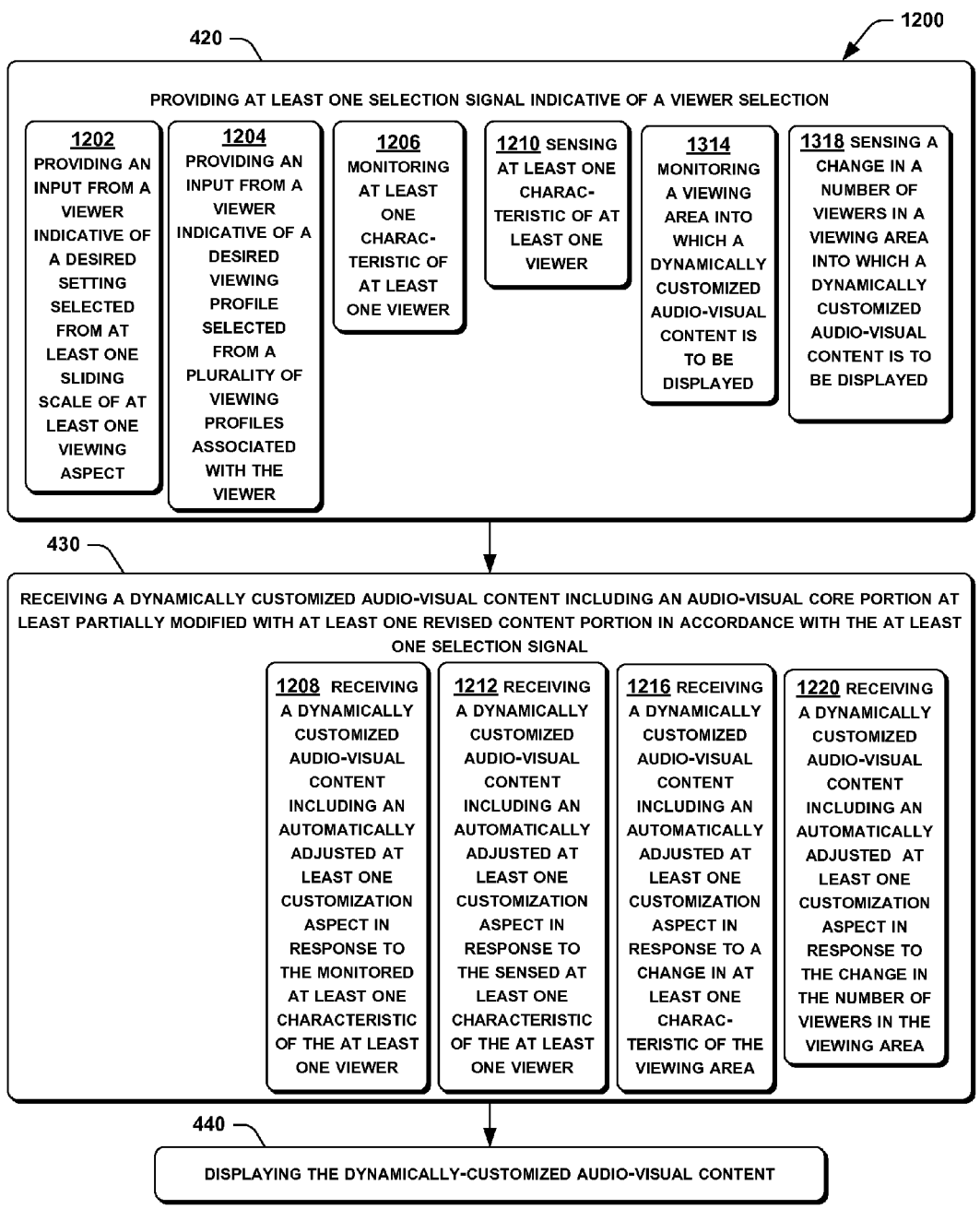
Figures 13, 14:
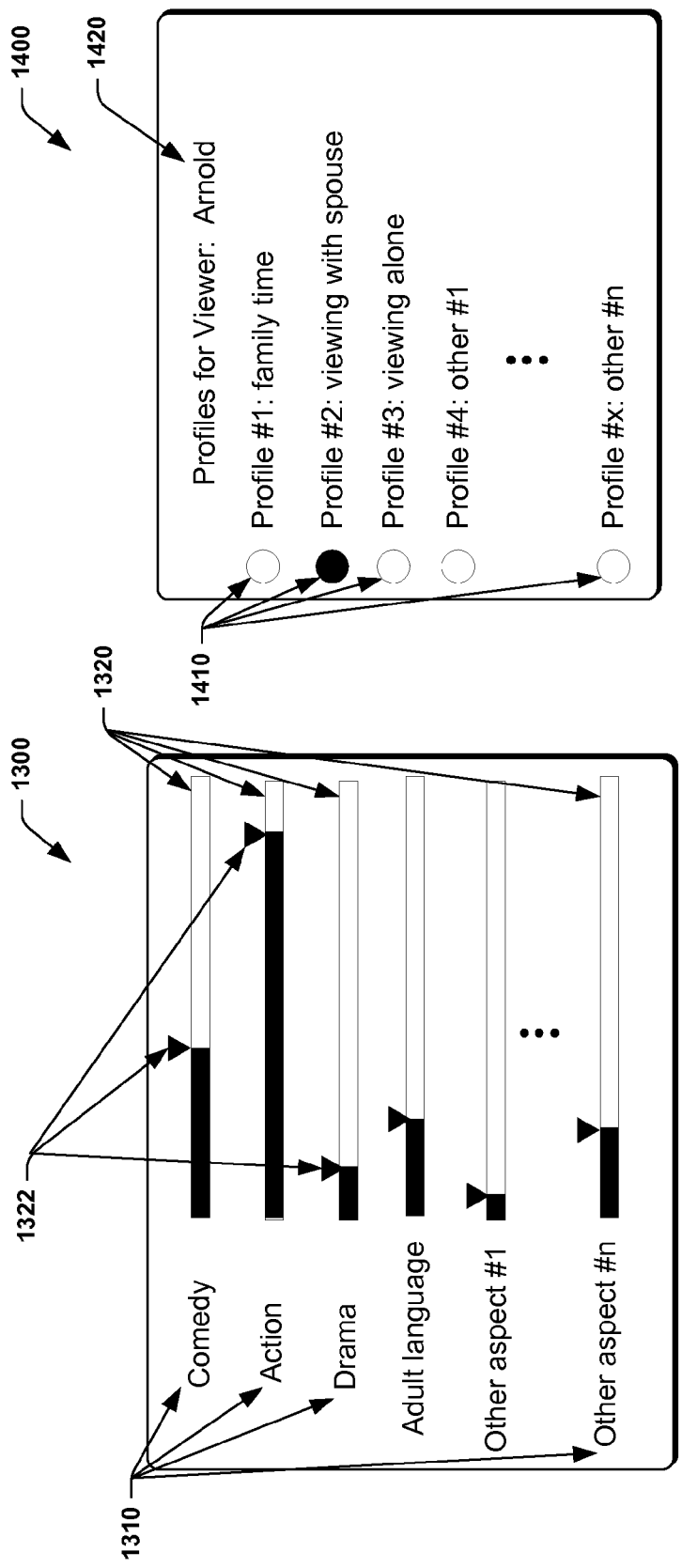

A variety of alternate embodiments of processes for viewing dynamically customized audio-visual content in accordance with the present disclosure may be conceived. For example, as shown in FIG. 12, in some implementations, providing at least one selection signal indicative of a preference at 420 may include providing an input from a viewer indicative of a desired setting selected from at least one sliding scale of at least one viewing aspect at 1202. For example, FIG. 13 shows one possible implementation of a user interface 1300 in accordance with the teachings of the present disclosure. In this implementation, the user interface 1300 displays a plurality of customization aspects 1310 having a corresponding plurality of sliding scales 1320 (e.g. comedy scale, action scale, drama scale, etc.). In operation, a viewer may position each selector 1322 associated with each sliding scale 1320 to indicate their desired preferences associated with each customization aspect 1310, resulting in a suitably customized audio-visual content.

Referring again to FIG. 12, in further implementations, providing at least one selection signal indicative of a preference at 420 may include providing an input from a viewer indicative of a desired viewing profile selected from a plurality of viewing profiles associated with the viewer at 1204. For example, FIG. 14 shows one possible implementation of a user interface 1400 in accordance with the teachings of the present disclosure. In this implementation, the user interface 1400 displays a plurality of customization profiles 1410 (e.g. family time, viewing with spouse, viewing alone, etc.) associated with a particular viewer 1420. In operation, the particular viewer 1420 may select the desired profile 1410 depending upon who else (if anyone) may be present in the viewing area with the particular viewer 1420, resulting in a suitably customized audio-visual content.

In still other implementations, providing at least one selection signal indicative of a preference at 420 may include monitoring at least one characteristic of at least one viewer at 1206 (e.g. facial features, smile, frown, scowl, displeasure, interest, lack of interest, laughter, tears, fear, anxiety, sadness, disgust, shock, distaste, etc.), and receiving a dynamically customized audio-visual content including an audio-visual core portion at least partially modified with at least one revised content portion in accordance with the at least one selection signal at 430 may include receiving a dynamically customized audio-visual content including an automatically adjusted at least one customization aspect in response to the monitored at least one characteristic of the at least one viewer (e.g. receiving a dynamically customized content having increased comedy aspects, reduced horror aspects, increased dramatic aspects, reduced profantify aspects, etc.) at 1208. For example, in some implementations, a monitoring device (e.g. the sensor 250) may sense facial features associated with displeasure at particular occurences of profane dialogue, and may automatically reduce the amount of profanity contained in the dialogue. Alternately, the monitoring device may sense a higher-than-desired level of fear, and may automatically reduce the horror aspects of the dynamically customized audio-visual content so provide a desired level of fear to the viewer.

In still further implementations, providing at least one selection signal indicative of a preference at 420 may include sensing at least one characteristic of at least one viewer at 1210, and receiving a dynamically customized audio-visual content including an audio-visual core portion at least partially modified with at least one revised content portion in accordance with the at least one selection signal at 430 may include receiving a dynamically customized audio-visual content including an automatically adjusted at least one customization aspect in response to the sensed at least one characteristic of the at least one viewer at 1312. For example, in some implementations, a sensing device (e.g. a Microsoft Kinect® device, a Nintendo Wii®, device, etc.) may sense interest from the viewer in particular occurences of content being displayed (e.g. history-related content), and may automatically change from a first viewing profile (e.g. a profile that has increased emphasis on comedy) to a second viewing profile (e.g. a profile that has increased emphasis on historical topics or documentary topics). Alternately, the monitoring device may sense a higher-than-desired level of fear, and may automatically reduce the horror aspects of the dynamically customized audio-visual content so provide a desired level of fear to the viewer.

With continued reference to FIG. 12, in other implementations, providing at least one selection signal indicative of a preference at 420 may include monitoring a viewing area into which a dynamically-customized audio-visual content is to be displayed at 1214, and receiving a dynamically customized audio-visual content including an audio-visual core portion at least partially modified with at least one revised content portion in accordance with the at least one selection signal at 430 may include receiving a dynamically customized audio-visual content including an automatically adjusted at least one customization aspect in response to a change in at least one characteristic of the viewing area at 1216. For example, in some implementations, a monitoring device may sense that a less than desired amount of laughter is occurring in the viewing area (e.g. using pattern recognition techniques, etc.), and may automatically increase a comedy level of the dynamically customized audio-visual content. Alternately, the sensing device may sense that more than a desired level of screaming is occurring within the viewing area, and may automatically reduce a horror level of the dynamically customized audio-visual content.

In additional implementations, providing at least one selection signal indicative of a preference at 420 may include sensing a change in a number of viewers in a viewing area into which a dynamically-customized audio-visual content is to be displayed at 1218, and receiving a dynamically customized audio-visual content including an audio-visual core portion at least partially modified with at least one revised content portion in accordance with the at least one selection signal at 430 may include receiving a dynamically customized audio-visual content including an automatically adjusted at least one customization aspect in response to a change in the number of viewers in the viewing area at 1320. For example, in some implementations, a monitoring device may sense that a viewer's spouse has entered the viewing area (e.g. using facial recognition techniques, body recognition techniques, voice recognition techniques, etc.), and may automatically change from a first viewing profile (e.g. a profile associated with "viewing alone") to a second viewing profile (e.g. a profile associated with "viewing with spouse"). Alternately, the sensing device may sense that a viewer's children have departed from the viewing area, and may automatically change from a family-oriented viewing profile to an individual-oriented viewing profile.

Figure 15:
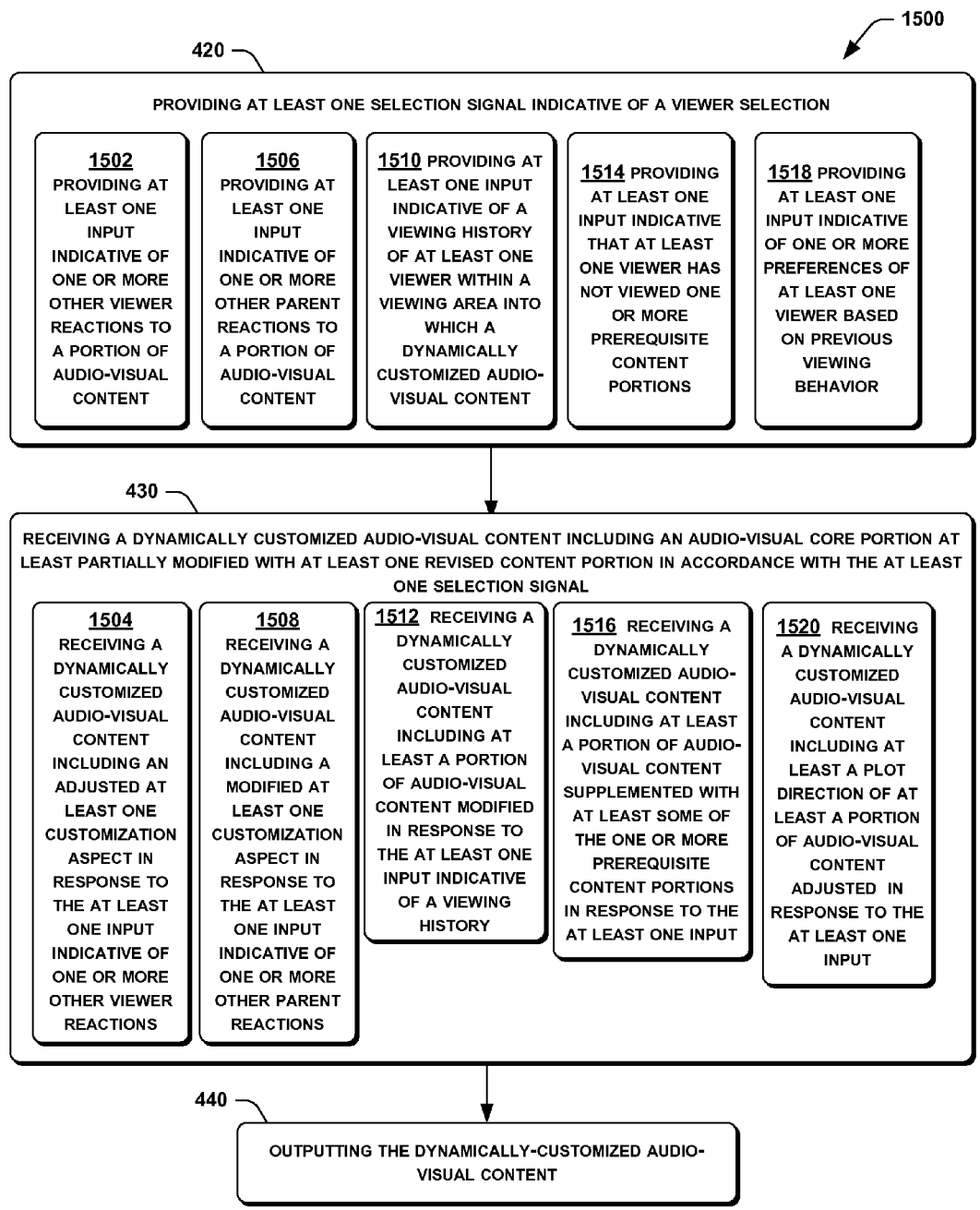

FIG. 15 shows additional embodiments of processes for viewing dynamically customized audio-visual content in accordance with the present disclosure. More specifically, in some implementations, providing at least one selection signal indicative of a preference at 420 may include providing at least one input indicative of one or more other viewer reactions to a portion of audio-visual content at 1502, and receiving a dynamically customized audio-visual content including an audio-visual core portion at least partially modified with at least one revised content portion in accordance with the at least one selection signal at 430 may include receiving a dynamically customized audio-visual content including an adjusted at least one customization aspect in response to the at least one input indicative of one or more other viewer reactions at 1504. For example, in some implementations, an input signal may be received (e.g. from a repository of information on viewer reactions, from a service that assesses viewer reactions, etc.) that indicates that other demographically-similar viewers (e.g. other viewers of same age, other viewers of same gender, other viewers of same ethnic heritage, etc.) reacted negatively to a particular portion of audio-visual content (e.g. a scene, a portion of dialogue, a visual image, etc.), and in response to the at least one input, at least one customization aspect of the dynamically customized audio-visual content is adjusted (e.g. deleting a scene, changing a dialogue, changing an actor ethnicity, etc.).

In other implementations, providing at least one selection signal indicative of a preference at 420 may include providing at least one input indicative of one or more other parent reactions to a portion of audio-visual content at 1506, and receiving a dynamically customized audio-visual content including an audio-visual core portion at least partially modified with at least one revised content portion in accordance with the at least one selection signal at 430 may include receiving a dynamically customized audio-visual content including at least a portion of audio-visual content modified in response to the at least one input indicative of one or more other parent reactions at 1508. For example, in some implementations, an input may be received indicating that a majority of parents reacted negatively to a particular portion of audio-visual content (e.g. dialogue that includes profanity, scenes that include violent content, scenes that include adult situations, etc.), and in response to the at least one input, one or more aspects of the dynamically customized audio-visual content may be modified (e.g. deleting a scene, changing a dialogue, adjusting a clothing of actors, etc.) in response to the at least one input indicative of one or more other parent reactions.

In further implementations, providing at least one selection signal indicative of a preference at 420 may include providing at least one input indicative of a viewing history of at least one viewer within a viewing area into which a dynamically customized audio-visual content is to be displayed at 1510, and receiving a dynamically customized audio-visual content including an audio-visual core portion at least partially modified with at least one revised content portion in accordance with the at least one selection signal at 430 may include receiving a dynamically customized audio-visual content including at least a portion of audio-visual content modified in response to the at least one input indicative of a viewing history at 1512. For example, in some implementations, an input may be received indicating that a viewer has repeatedly changed a channel whenever a particular portion of audio-visual content has been displayed, and in response to the at least one input, the audio-visual core portion is automatically modified by replacing the particular portion of audio-visual content with a replacement portion of content.

With continued reference to FIG. 15, in still further implementations, providing at least one selection signal indicative of a preference at 420 may include providing at least one input indicative that at least one viewer has not viewed one or more prerequisite content portions at 1514, and receiving a dynamically customized audio-visual content including an audio-visual core portion at least partially modified with at least one revised content portion in accordance with the at least one selection signal at 430 may include receiving a dynamically customized audio-visual content including at least a portion of audio-visual content supplemented with at least some of the one or more prerequisite content portions in response to the at least one input at 1516. For example, in some implementations, an input may be received indicating that a viewer has missed previous episodes of a series, and in response to the at least one input, the audio-visual core portion is automatically supplemented with one or more scenes that provide essential plot points that the viewer will need to view in order to be brought up to speed for the upcoming episode.

In additional implementations, providing at least one selection signal indicative of a preference at 420 may include providing at least one input indicative of one or more preferences of at least one viewer based on previous viewing behavior at 1518, and receiving a dynamically customized audio-visual content including an audio-visual core portion at least partially modified with at least one revised content portion in accordance with the at least one selection signal at 430 may include receiving a dynamically customized audio-visual content including at least a plot direction of at least a portion of audio-visual content adjusted in response to the at least one input at 1620. For example, in some implementations, an input may be received indicating that a viewer prefers sad endings over happy endings, and in response to the at least one input, the audio-visual core portion is automatically modified to provide a plot direction that ends up with a sad ending rather than a happy ending.

Figure 16:
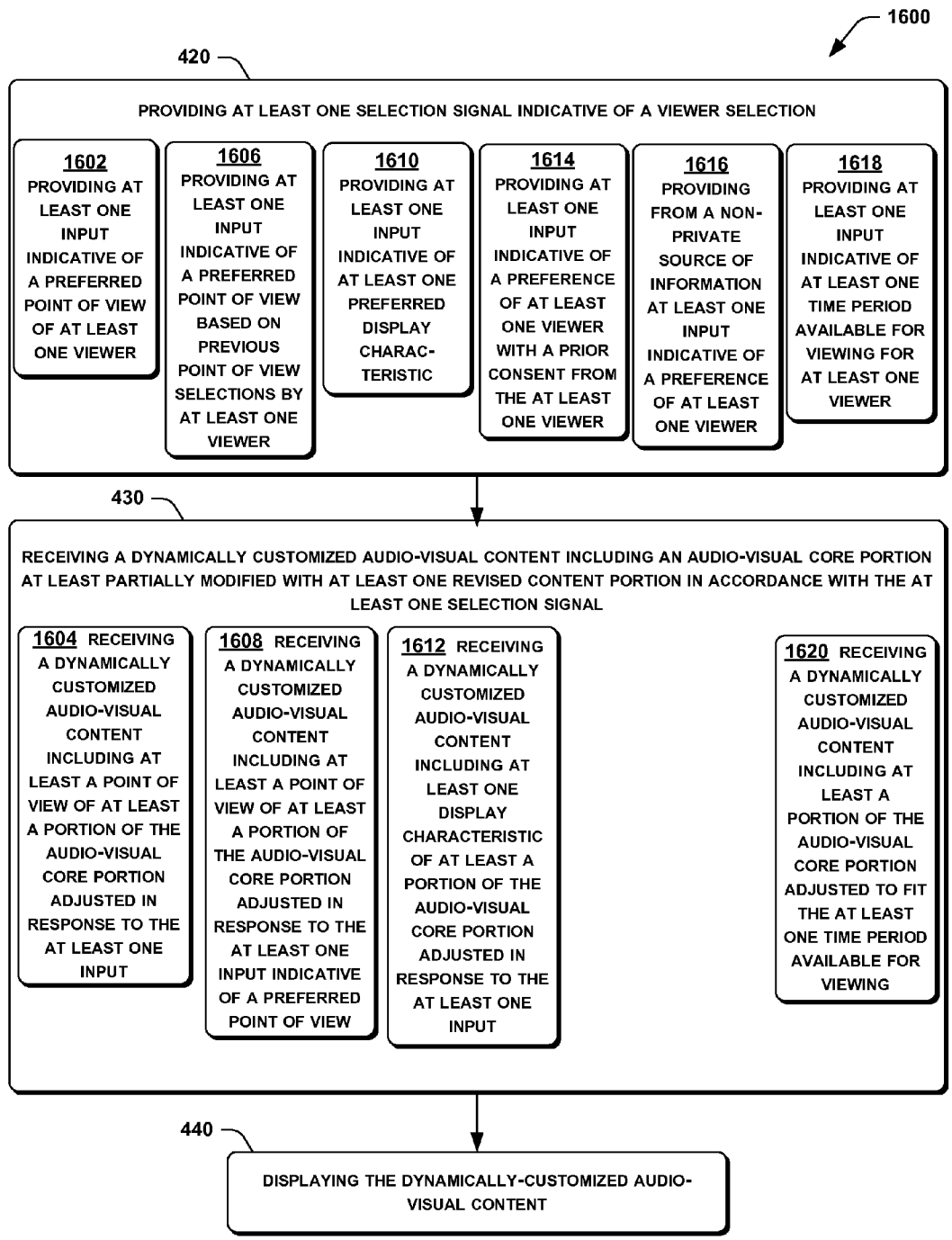

FIG. 16 shows additional alternate embodiments of processes for dynamic customization of audio-visual broadcasts in accordance with the present disclosure. More specifically, in some implementations, providing at least one selection signal indicative of a preference at 420 may include providing at least one input indicative of a preferred point of view of at least one viewer at 1602, and receiving a dynamically customized audio-visual content including an audio-visual core portion at least partially modified with at least one revised content portion in accordance with the at least one selection signal at 430 may include receiving a dynamically customized audio-visual content including at least a point of view of at least a portion of the audio-visual core portion adjusted in response to the at least one input at 1604. For example, in some implementations, a viewer may manually select from a menu of available points of view (e.g. from a first person perspective of one of the characters, from a third party perspective, a top view, side view, etc.), and in response to the at least one input, the audio-visual core portion is adjusted to show content from the selected perspective (e.g. a fight scene from the perspective of one of the fighters, etc.).

In other implementations, providing at least one selection signal indicative of a preference at 420 may include providing at least one input indicative of a preferred point of view based on previous point of view selections by at least one viewer at 1606, and receiving a dynamically customized audio-visual content including an audio-visual core portion at least partially modified with at least one revised content portion in accordance with the at least one selection signal at 430 may include receiving a dynamically customized audio-visual content including at least a point of view of at least a portion of the audio-visual core portion adjusted in response to the at least one input indicative of a preferred point of view at 1608. For example, in some implementations, a preferred point of view may be determined from a database of previous selections by a viewer, and in response to the at least one input, the audio-visual core portion is adjusted to show content from the determined perspective.

In further implementations, providing at least one selection signal indicative of a preference at 420 may include providing at least one input indicative of at least one preferred display characteristic at 1610, and receiving a dynamically customized audio-visual content including an audio-visual core portion at least partially modified with at least one revised content portion in accordance with the at least one selection signal at 430 may include receiving a dynamically customized audio-visual content including at least one display characteristic of at least a portion of the audio-visual core portion adjusted in response to the at least one input at 1612. For example, in some implementations, an input may be received that indicates a display characteristic suitable to a particular viewing environment (e.g. a brightness, a contrast, a volume level, an outdoor viewing environment, etc.) or suitable to a particular viewing device (e.g. an aspect ratio, a display resolution value, a screen size, etc.), and the audio-visual core portion may be adjusted to be optimally displayed in accordance with the display characteristic.

In still other implementations, providing at least one selection signal indicative of a preference at 420 may include providing at least one input indicative of a preference of at least one viewer with a prior consent from the at least one viewer at 1614 (e.g. receiving an input indicating a preference after a viewer "opts in"). In additional implementations, providing at least one selection signal indicative of a preference at 420 may include providing from a non-private source of information at least one input indicative of a preference of at least one viewer at 1616 (e.g. receiving an input from a viewer's public blog indicating a preference, receiving an input from a viewer's public information placed on a social networking site indicating a preference, etc.).

In yet other implementations, providing at least one selection signal indicative of a preference at 420 may include providing at least one input indicative of a time period available for viewing for at least one viewer at 1618 (e.g. receiving a manual input from a viewer, reading a viewer's calendar or scheduling software, etc.), and receiving a dynamically customized audio-visual content including an audio-visual core portion at least partially modified with at least one revised content portion in accordance with the at least one selection signal at 430 may include receiving a dynamically customized audio-visual content including at least a portion of the audio-visual core portion adjusted to fit the at least one time period available for viewing at 1620 (e.g. omitting a non-essential portion of the audio-visual core portion, etc.).

Additional Exemplary Systems for Dynamic Customization of Audio-Visual Content

Figure 17:
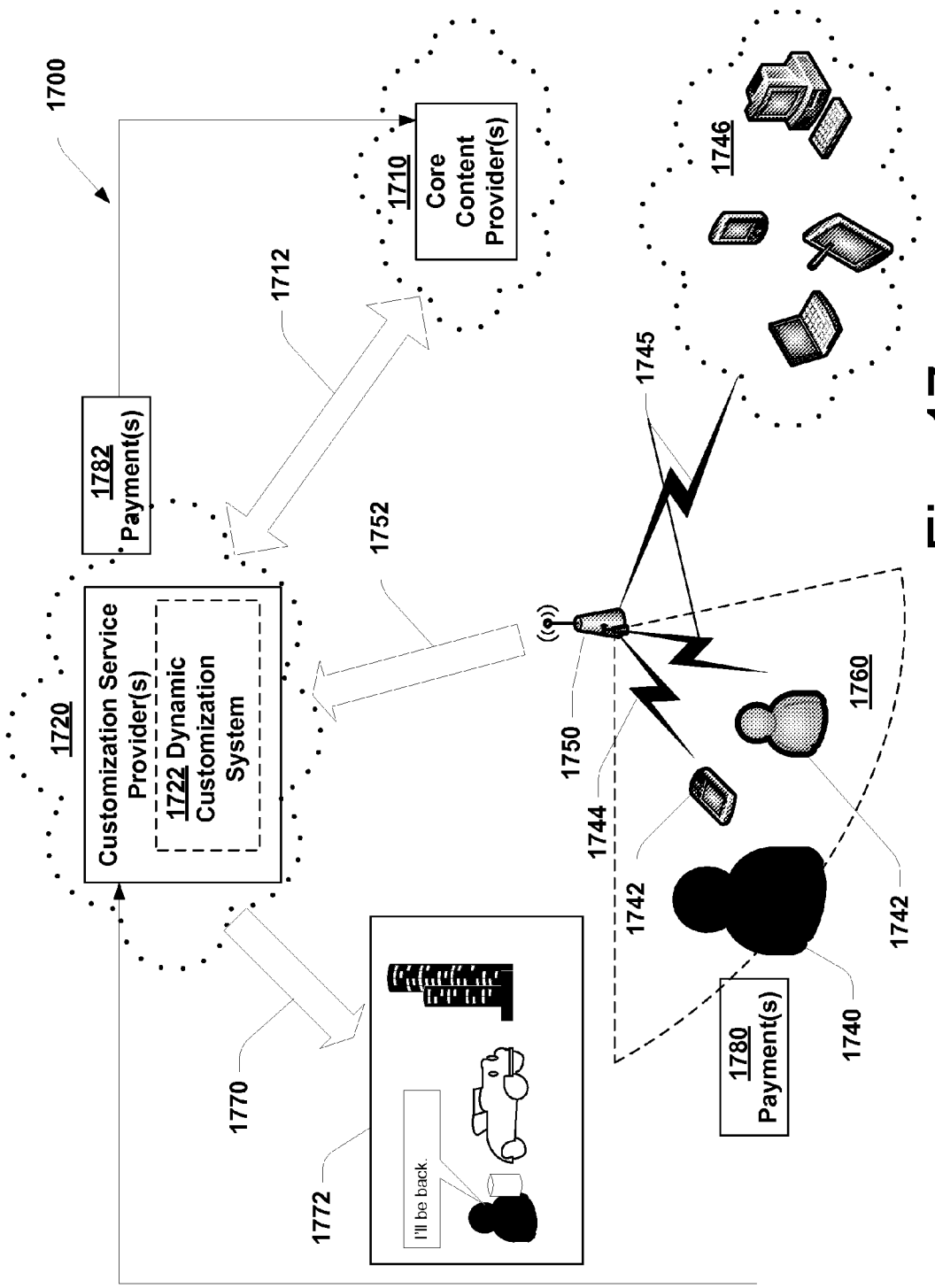
FIGS. 17-18 show a schematic view of an alternate system for dynamic customization of audio-visual content in accordance with possible implementations of the present disclosure.

FIG. 17 is a schematic view of a representative system 1700 for dynamic customization of audio-visual content in accordance with an alternate implementation of the present disclosure. In this implementation, the system 1700 includes one or more core content providers 1710 that provide one or more audio-visual core portions 1712 to one or more customization service providers 1720. The one or more customization service providers 1720 include at least one dynamic customization system 1722, which may include one or more of the components described above with respect to FIGS. 1-3.

As further shown in FIG. 17, a viewer 1740 may provide one or more selection signals 1744 using a manual input device 1742. In some implementations, the one or more selections signals 1744 may be provided to a sensor 1750 which, in turn, provides selection inputs 1752 corresponding to the selection signals 1744 to the one or more dynamic customization service providers 1720. Alternately, the sensor 1750 may be eliminated, and the selection signals 1744 may be communicated directly to the one or more dynamic customization service providers 1720.

As further shown in FIG. 17, in some embodiments, the sensor 1750 may receive one or more supplemental selection signals 1745 from one or more electronic devices 1746 (e.g. laptop, desktop, personal data assistant, cell phone, iPad, iPhone, etc.) associated with the viewer 1740. As described above, the one or more supplemental selection signals 1745 may be based on a variety of suitable information, including, for example, browsing histories, purchase records, call records, downloaded content, or any other suitable information or data. In some implementations, one or more supplemental selection signals 1745 may be automatically determined from one or more characteristics of a viewing area 1760, such as a presence of one or more additional viewers 1742 (e.g. a child, spouse, friend, visitor, etc.).

In operation, the one or more customization service providers 1720 receive the one or more selection inputs 1752 (or default inputs if specific inputs are not provided), and the audio-visual core portion 1712 from the one or more core content providers 1710, and using the one or more dynamic customization systems 1722, provide a dynamically customized audio-visual content 1770 to a display 1772 visible to the one or more viewers 1740, 1742 in the viewing area 1760.

In at least some embodiments, one or more viewers 1740, 1742 may provide one or more payments 1780 to the one or more customization service providers 1720 in exchange for the dynamically customized audio-visual content 1770. Similarly, in at least some embodiments the one or more customization service providers 1720 may provide one or more payments 1782 to the one or more core content providers 1710 in exchange for the core audio-visual content 1712. In some embodiments, the amounts of at least one of the one or more payments 1780, or the one or more payments 1782, may be at least partially determined using one or more processes in accordance with the teachings of the present disclosure, as described more fully below.

Again, it should be appreciated that, in some embodiments, the audio-visual core portion 1712 may consist of solely an audio portion, or solely a visual (or video) portion, a separate audio portion, a separate visual portion, a plurality of audio portions, a plurality of visual portions, or any suitable combination thereof. Similarly, in various embodiments, the dynamically customized audio-visual core portion 1770 may consist of solely an audio portion, or solely a visual (or video) portion, a separate audio portion, a separate visual portion, a plurality of audio portions, a plurality of visual portions, or any suitable combination thereof.

Figure 18:
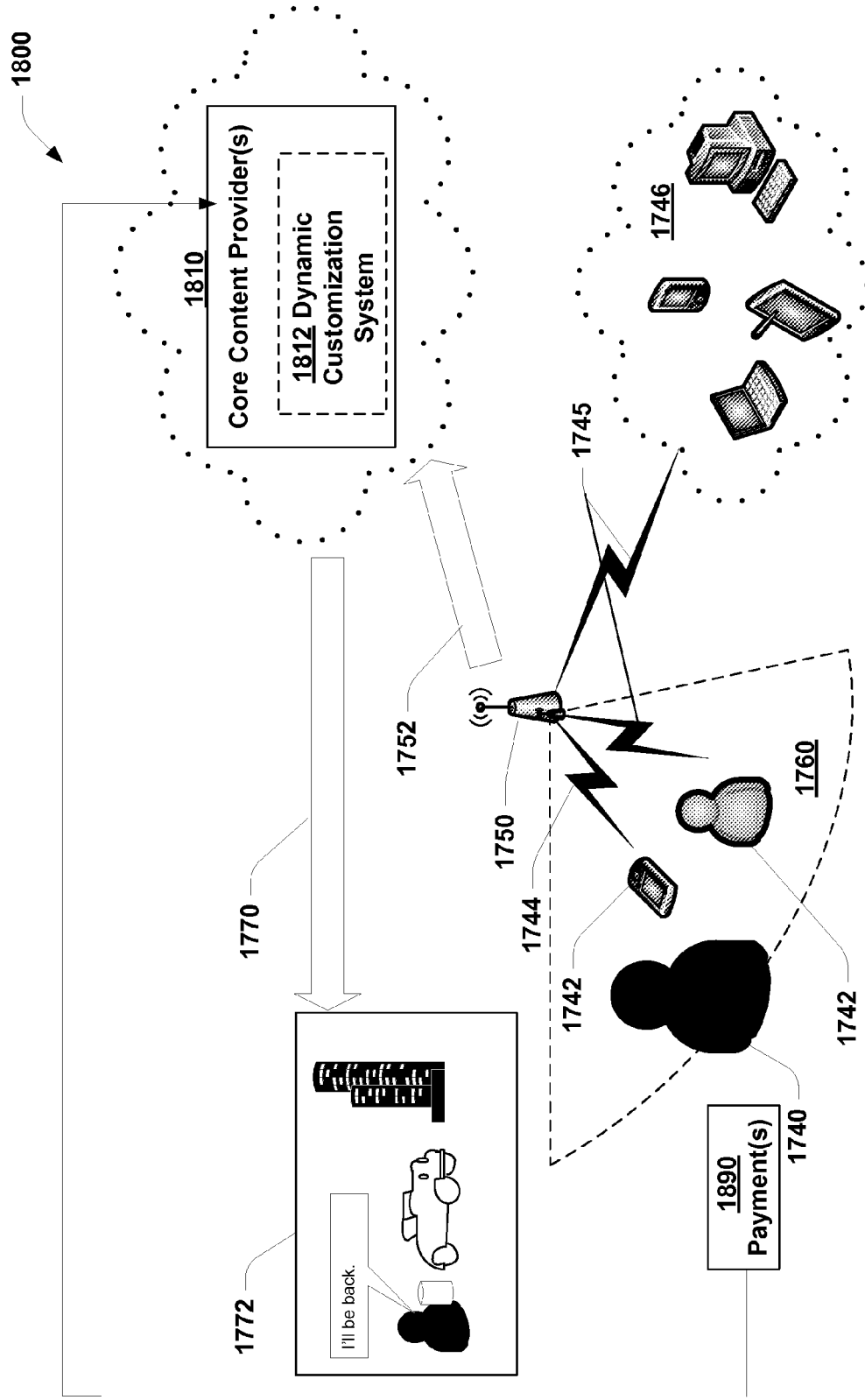

FIG. 18 shows a schematic view of another representative system 1800 for dynamic customization of audio-visual broadcasts in accordance with an alternate implementation of the present disclosure. It will be appreciated that, in this implementation, the system 1800 includes the same components as described above for the system 1700 shown in FIG. 17, however, the one or more customization service providers 1720 have been eliminated. For the sake of brevity, a description of the components described above with respect to FIG. 17 will not be repeated, but rather, the significant new aspects of the system 1800 shown in FIG. 18 will be described.

As shown in FIG. 18, in some implementations, the one or more selection inputs 1752 are provided to one or more core content providers 1810. The one or more core content providers 1810 have one or more dynamic customization systems 1812. In operation, the one or more core content providers 1810 receive the one or more selection inputs 1812 (or default inputs if specific inputs are not provided), and modify an audio-visual core portion using the one or more dynamic customization systems 1812 to provide a dynamically customized audio-visual content 1770 to a display 1772 visible to one or more viewers 1740, 1742 in a viewing area 1760. Thus, in at least some implementations, the one or more customization service providers 1720 shown in FIG. 17 may be eliminated, and the same one or more entities that normally provide an audio-visual core portion (e.g. normal television broadcasts, etc.) may perform the dynamic customization to provide the desired dynamically customized audio-visual content to viewers.

In at least some embodiments, the one or more viewers 1740, 1742 may provide one or more payments 1890 to the one or more core content providers 1810 in exchange for the dynamically customized audio-visual content 1770. In some embodiments, the amount of the one or more payments 1890 may be defined using one or more processes in accordance with the teachings of the present disclosure, as described more fully below.

Of course, other environments may be implemented to perform the dynamic customization of audio-visual content in accordance with the present disclosure, and systems in accordance with the present disclosure are not necessarily limited to the specific implementations shown and described herein. Additional functions and operational aspects of systems in accordance with the teachings of the present disclosure are described more fully below.

Additional Exemplary Processes for Viewing Dynamically Customized Audio-Visual Content In the following description of additional exemplary processes for viewing dynamically customized audio-visual content, reference will be made to specific components of the exemplary systems described above. It will be appreciated, however, that such references are merely exemplary, and that the inventive processes are not limited to being implemented on the specific systems described above, but rather, the processes described herein may be implemented on a wide variety of suitable systems and in a wide variety of suitable environments.

Figure 19:
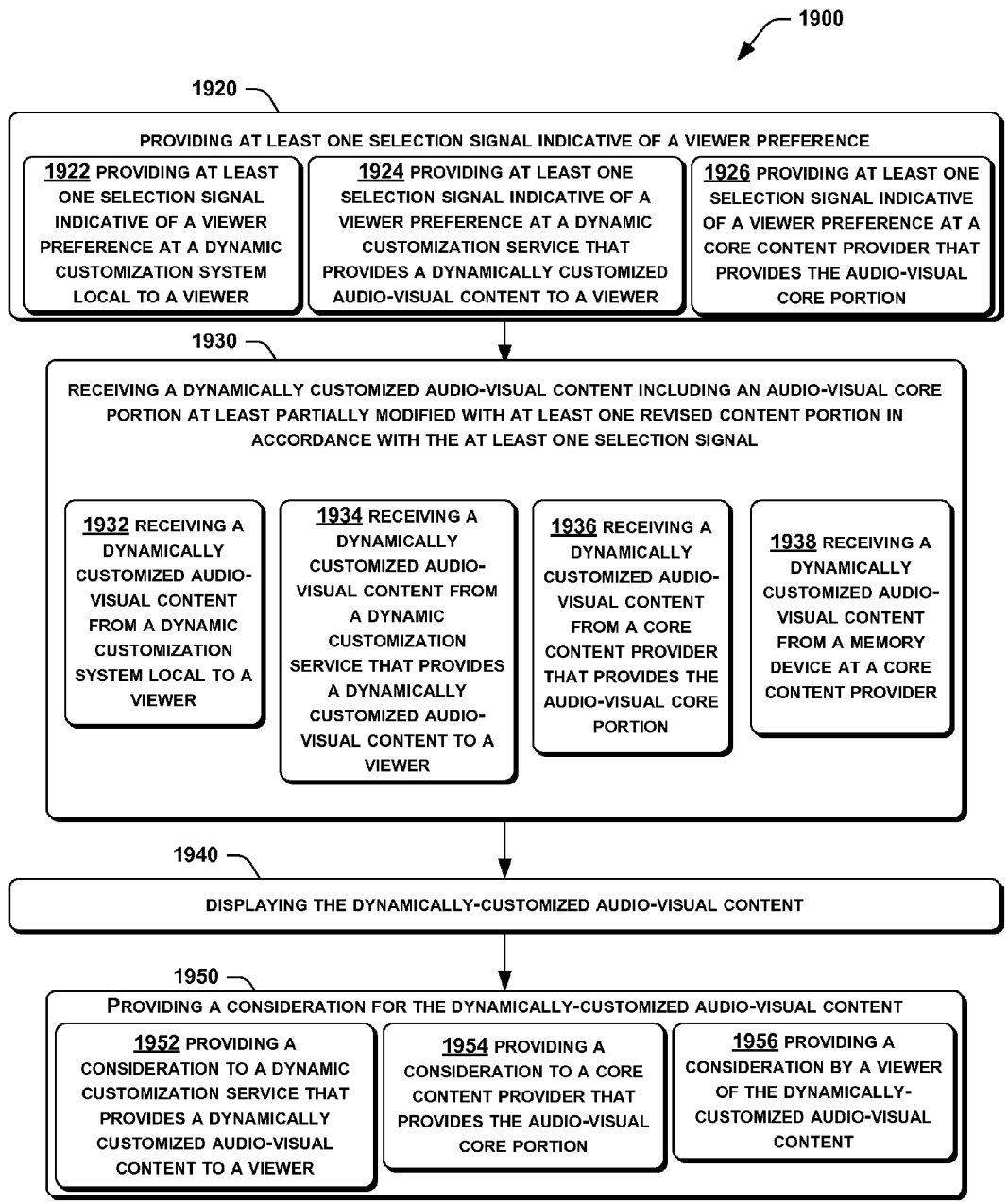
FIG. 19 shows a flowchart of alternate processes for viewing dynamically customized audio-visual content in accordance with further possible implementations of the present disclosure.

FIG. 19 shows a flowchart of a process 1900 for viewing dynamically customized audio-visual content in accordance with an implementation of the present disclosure. As shown in FIG. 19, in some implementations, providing at least one selection signal indicative of a preference at 1920 may include providing at least one selection signal indicative of a viewer preference to a dynamic customization system local to a viewer at 1922 (e.g. dynamic customization system 100 shown in FIG. 1). In further implementations, providing at least one selection signal indicative of a preference at 1920 may include providing at least one selection signal indicative of a viewer preference to a dynamic customization service that provides a dynamically customized audio-visual content to a viewer at 1924 (e.g. customization service provider 1720 shown in FIG. 17). In still further implementations, providing at least one selection signal indicative of a preference at 1920 may include providing at least one selection signal indicative of a viewer preference to a core content provider at 1926 (e.g. core content provider 1810 shown in FIG. 18).

In still other implementations, receiving a dynamically customized audio-visual content including an audio-visual core portion at least partially modified with at least one revised content portion in accordance with the at least one selection signal at 1930 may include receiving a dynamically customized audio-visual content from a dynamic customization system local to a viewer at 1932 (e.g. dynamic customization system 100 shown in FIG. 1). In other implementations, receiving a dynamically customized audio-visual content including an audio-visual core portion at least partially modified with at least one revised content portion in accordance with the at least one selection signal at 1930 may include receiving a dynamically customized audio-visual content from a dynamic customization service that provides a dynamically customized audio-visual content to a viewer at 1934 (e.g. customization service provider 1719 shown in FIG. 17). In still other implementations, receiving a dynamically customized audio-visual content including an audio-visual core portion at least partially modified with at least one revised content portion in accordance with the at least one selection signal at 1930 may include receiving a dynamically customized audio-visual content from a core content provider at 1936 (e.g. core content provider 1810 shown in FIG. 18). In additional implementations, receiving a dynamically customized audio-visual content including an audio-visual core portion at least partially modified with at least one revised content portion in accordance with the at least one selection signal at 1930 may include receiving a dynamically customized audio-visual content from a memory device at a core content provider at 1938 (e.g. core content provider 1810 shown in FIG. 18).

As further shown in FIG. 19, in alternate implementations, providing a consideration for the dynamically-customized audio-visual content at 1950 may include providing a consideration to a dynamic customization service that provides a dynamically customized audio-visual content to a viewer at 1952 (e.g. customization service provider 1720 shown in FIG. 17). In further alternate implementations, providing a consideration for the dynamically-customized audio-visual content at 1950 may include providing a consideration to a core content provider that provides the audio-visual core portion at 1954 (e.g. core content provider 1810 shown in FIG. 18). Finally, in additional embodiments, providing a consideration for the dynamically-customized audio-visual content at 1950 may include providing a consideration by a viewer of the dynamically-customized audio-visual content at 1956 (e.g. viewer 132, viewer 1740, etc.).

It should be appreciated that the particular embodiments of processes described herein are merely possible implementations of the present disclosure, and that the present disclosure is not limited to the particular implementations described herein and shown in the accompanying figures. For example, in alternate implementations, certain acts need not be performed in the order described, and may be modified, and/or may be omitted entirely, depending on the circumstances. Moreover, in various implementations, the acts described may be implemented by a computer, controller, processor, programmable device, or any other suitable device, and may be based on instructions stored on one or more computer-readable media or otherwise stored or programmed into such devices. In the event that computer-readable media are used, the computer-readable media can be any available media that can be accessed by a device to implement the instructions stored thereon.

Various methods, systems, and techniques have been described herein in the general context of computer-executable instructions, such as program modules, executed by one or more processors or other devices. Generally, program modules include routines, programs, objects, components, data structures, etc. that perform particular tasks or implement particular abstract data types. Typically, the functionality of the program modules may be combined or distributed as desired in various alternate embodiments. In addition, embodiments of these methods, systems, and techniques may be stored on or transmitted across some form of computer readable media.

It may also be appreciated that there may be little distinction between hardware and software implementations of aspects of systems and methods disclosed herein. The use of hardware or software may generally be a design choice representing cost vs. efficiency tradeoffs, however, in certain contexts the choice between hardware and software can become significant. Those having skill in the art will appreciate that there are various vehicles by which processes, systems, and technologies described herein can be effected (e.g., hardware, software, firmware, or combinations thereof), and that a preferred vehicle may vary depending upon the context in which the processes, systems, and technologies are deployed. For example, if an implementer determines that speed and accuracy are paramount, the implementer may opt for a mainly hardware and/or firmware vehicle. Alternatively, if flexibility is paramount, the implementer may opt for a mainly software implementation. In still other implementations, the implementer may opt for some combination of hardware, software, and/or firmware. Hence, there are several possible vehicles by which the processes and/or devices and/or other technologies described herein may be effected, and which may be desired over another may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into workable systems having the described functionality. That is, at least a portion of the devices and/or processes described herein can be developed into a workable system via a reasonable amount of experimentation.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" (or "operatively connected," or "operatively coupled") to each other to achieve the desired functionality, and any two components capable of being so associated can also be viewed as being "operably couplable" (or "operatively couplable") to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. For example, in some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

As a further example of "open" terms in the present specification and claims, it will be understood that usage of a language construction "A or B" is generally interpreted as a non-exclusive "open term" meaning. A alone, B alone, and/or A and B together.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of providing audio-visual content, comprising:
    sensing one or more viewers present within a viewing area;
    providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal, the at least one selection signal to revise at least one animated character of an audio-visual core portion with at least one replacement animated character within the audio-visual core portion; and
    receiving a dynamically customized audio-visual content including the audio-visual core portion at least partially modified with the at least one revised content portion in accordance with the at least one selection signal.

2. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:
    providing at least one selection signal indicative of a preference of a viewer based on at least some of the one or more viewers sensed within the viewing area, including at least facilitating a first electronic device scanning a memory of a second electronic device associated with at least one of the one or more viewers to obtain data generated by a user input device of the electronic device.

3. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:
- scanning by a first electronic device of a memory of a communication device associated with the viewer to obtain at least one supplemental signal associated with a viewer; and
- providing at least one selection signal based on the at least partially on the at least one supplemental signal.

4. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:
- providing at least one selection signal based at least partially on the scanning, the at least one selection signal being configured to facilitate customization of a non-advertising aspect of the audio-visual core portion.

5. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:
- querying by a first electronic device of a memory of a second electronic device, the second electronic device including at least one of a cellular telephone, a laptop, a tablet, or a communication device associated with a viewer; and
- providing at least one selection signal based at least partially on the querying.

6. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:
- arbitrating between at least two conflicting selection signals; and
- providing at least one selection signal at least partially based on the arbitrating.

7. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:
- between at least two conflicting selection signals, determining which selection signal to provide based on a pre-determined ranking; and
- providing at least one selection signal at least partially based on the determining.

8. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:
- between at least two conflicting selection signals, determining which signal to apply based on one or more rules; and
- providing at least one selection signal at least partially based on the determining.

9. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:
- determining whether to provide the at least one selection signal based on an authorization level.

10. The method of claim 1, wherein receiving a dynamically customized audio-visual content including the audio-visual core portion at least partially modified with at least one revised content portion in accordance with the at least one selection signal comprises:
- receiving a dynamically customized audio-visual content including the audio-visual core portion having one or more background noises replaced with one or more replacement background noises.

11. The method of claim 1, wherein receiving a dynamically customized audio-visual content including the audio-visual core portion at least partially modified with at least one revised content portion in accordance with the at least one selection signal comprises:
- receiving a dynamically customized audio-visual content including the audio-visual core portion having one or more background noises replaced with one or more replacement background noises; and
- receiving a dynamically customized audio-visual content including the audio-visual core portion having one or more background visual components replaced with one or more replacement background visual components.

12. The method of claim 1, wherein receiving a dynamically customized audio-visual content including the audio-visual core portion at least partially modified with at least one revised content portion in accordance with the at least one selection signal comprises:
- receiving a dynamically customized audio-visual content including the audio-visual core portion having a culturally inappropriate portion at least one of replaced with a culturally appropriate portion or omitted.

13. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:
- providing a selection signal indicative of a cultural heritage of at least one viewer;
and
- wherein receiving a dynamically customized audio-visual content including the audio-visual core portion at least partially modified with at least one revised content portion in accordance with the at least one selection signal comprises:
- receiving a dynamically customized audio-visual content including the audio-visual core portion having a portion considered inappropriate with respect to the cultural heritage of the at least one viewer at least one of replaced with a replacement portion considered appropriate with respect to the cultural heritage of the at least one viewer, or omitted.

14. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:
providing a selection signal indicative of a geographic location of at least one viewer; and
wherein receiving a dynamically customized audio-visual content including the audio-visual core portion at least partially modified with at least one revised content portion in accordance with the at least one selection signal comprises:
receiving a dynamically customized audio-visual content including the audio-visual core portion having a portion considered inappropriate with respect to the geographic location of the at least one viewer at least one of replaced with a replacement portion considered appropriate with respect to the geographic location of the at least one viewer, or omitted.

15. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:
providing a selection signal indicative of a cultural identity of at least one viewer; and
wherein receiving a dynamically customized audio-visual content including the audio-visual core portion at least partially modified with at least one revised content portion in accordance with the at least one selection signal comprises:
receiving a dynamically customized audio-visual content including the audio-visual core portion having a portion of content inappropriate for the cultural identity of the at least one viewer at least one of replaced with an appropriate portion of content, or omitted.

16. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:
monitoring at least one characteristic of at least one viewer; and
wherein receiving a dynamically customized audio-visual content including the audio-visual core portion at least partially modified with at least one revised content portion in accordance with the at least one selection signal comprises:
receiving a dynamically customized audio-visual content including an automatically adjusted at least one customization aspect in response to the monitored at least one characteristic of the at least one viewer.

17. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:
sensing at least one characteristic of at least one viewer; and
wherein receiving a dynamically customized audio-visual content including the audio-visual core portion at least partially modified with at least one revised content portion in accordance with the at least one selection signal comprises:
receiving a dynamically customized audio-visual content including an automatically adjusted at least one customization aspect in response to the sensed at least one characteristic of the at least one viewer.

18. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:
monitoring a viewing area into which a dynamically-customized audio-visual content is to be displayed; and
wherein receiving a dynamically customized audio-visual content including the audio-visual core portion at least partially modified with at least one revised content portion in accordance with the at least one selection signal comprises:
receiving a dynamically customized audio-visual content including an automatically adjusted at least one customization aspect in response to a change in at least one characteristic of the viewing area.

19. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:
sensing a change in a number of viewers in a viewing area into which a dynamically-customized audio-visual content is to be displayed; and
wherein receiving a dynamically customized audio-visual content including the audio-visual core portion at least partially modified with at least one revised content portion in accordance with the at least one selection signal comprises:
receiving a dynamically customized audio-visual content including an automatically adjusted at least one customization aspect in response to a change in the number of viewers in the viewing area.

20. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:

providing at least one input indicative of one or more other viewer reactions to a portion of audio-visual content; and wherein receiving a dynamically customized audio-visual content including the audio-visual core portion at least partially modified with at least one revised content portion in accordance with the at least one selection signal comprises:

receiving a dynamically customized audio-visual content including an adjusted at least one customization aspect in response to the at least one input indicative of one or more other viewer reactions.

21. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:

providing at least one input indicative of one or more other parent reactions to a portion of audio-visual content; and wherein receiving a dynamically customized audio-visual content including the audio-visual core portion at least partially modified with at least one revised content portion in accordance with the at least one selection signal comprises:

receiving a dynamically customized audio-visual content including at least a portion of audio-visual content modified in response to the at least one input indicative of one or more other parent reactions.

22. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:

providing at least one input indicative of a viewing history of at least one viewer within a viewing area into which a dynamically customized audio-visual content is to be displayed; and wherein receiving a dynamically customized audio-visual content including the audio-visual core portion at least partially modified with at least one revised content portion in accordance with the at least one selection signal comprises:

receiving a dynamically customized audio-visual content including at least a portion of audio-visual content modified in response to the at least one input indicative of a viewing history.

23. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:

providing at least one input indicative that at least one viewer has not viewed one or more prerequisite content portions; and wherein receiving a dynamically customized audio-visual content including the audio-visual core portion at least partially modified with at least one revised content portion in accordance with the at least one selection signal comprises:

receiving a dynamically customized audio-visual content including at least a portion of audio-visual content supplemented with at least some of the one or more prerequisite content portions in response to the at least one input.

24. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:

providing at least one input indicative of one or more preferences of at least one viewer based on previous viewing behavior; and wherein receiving a dynamically customized audio-visual content including the audio-visual core portion at least partially modified with at least one revised content portion in accordance with the at least one selection signal comprises:

receiving a dynamically customized audio-visual content including at least a plot direction of at least a portion of audio-visual content adjusted in response to the at least one input.

25. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:

providing at least one input indicative of a preferred point of view of at least one viewer; and wherein receiving a dynamically customized audio-visual content including the audio-visual core portion at least partially modified with at least one revised content portion in accordance with the at least one selection signal comprises:

receiving a dynamically customized audio-visual content including at least a point of view of at least a portion of the audio-visual core portion adjusted in response to the at least one input.

26. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:

providing at least one selection signal indicative of a preference of a viewer, including at least facilitating a first electronic device scanning a memory of a second electronic device associated with at least one of the one or more viewers to at lest partially determine the at least one selection signal without regard to an identify of the viewer or a demographic characteristic of the viewer.

27. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:

provide at least one selection signal indicative of a preference of a viewer, including at least facilitating a first electronic device scanning web-browsing history stored on a memory of a second electronic device associated with at least one of the one or more viewers to at least partially determine the at least one selection signal without regard to an identify of the viewer or demographic characteristic of the viewer.

28. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:

providing at least one selection signal indicative of a preference of a viewer, including at least facilitating a first electronic device scanning a purchase record stored on a memory of a second electronic device associated with at least one of the one or more viewers to at least partially determine the at least one selection signal without regard to an identify of the viewer or demographic characteristic of the viewer.

29. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:

providing at least one selection signal indicative of a preference of a viewer, including at least facilitating a first electronic device scanning a memory of a second electronic device associated with at least one of the one or more viewers to at least partially determine the at least one selection signal, the at least one selection being configured to facilitate replacement of at least one actor of the audio-visual core portion with at least one replacement actor.

30. The method of claim 1, wherein providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:

providing at least one selection signal indicative of a preference of a viewer, including at least facilitating a first electronic device scanning a memory of a second electronic device associated with at least one of the one or more viewers to at least partially determine the at least one selection signal, the at least one selection signal being configured to facilitate at least:

replacement of at least one spoken portion of the audio-visual core portion with at least one replacement spoken portion; and replacement of at least one facial movement corresponding to the at least one spoken portion of the audio-visual core portion with at least one replacement facial movement corresponding to the at least one replacement spoken portion.

31. A system for providing audio-visual content, comprising:

circuitry for sensing one or more viewers present within a viewing area;

circuitry for providing at least one selection signal indicative of a preference of a viewer based on at least some of the one or more viewers sensed within the viewing area, including at least circuitry for facilitating a first electronic device scanning a memory of a second electronic device associated with at least one of the one or more viewers to at least partially determined the at least one selection signal, the at least one selection signal to revise at least one animated character of an audio-visual core portion with at least one replacement animated character within the audio-visual core portion; and circuitry for receiving a dynamically customized audio-visual content including the audio-visual core portion at least partially modified with the at least one revised content portion in accordance with the at least one selection signal.

32. The system of claim 31, wherein circuitry for providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determine the at least one selection signal comprises:

circuitry for providing at least one input indicative that at least one viewer has not viewed one or more prerequisite content portions; and wherein circuitry for receiving a dynamically customized audio-visual content including the audio-visual core portion at least partially modified with at least one revised content portion in accordance with the at least one selection signal comprises:

circuitry for receiving a dynamically customized audio-visual content including at least a portion of audio-visual content supplemented with at least some of the one or more prerequisite content portions in response to the at least one input.

33. One or more non-transitory computer-readable media bearing instructions that, when executed, perform a method of providing audio-visual content, the method comprising:

sensing one or more viewers present within a viewing area;

providing at least one selection signal indicative of a preference of a viewer based on at least some of the one or more viewers sensed within the viewing area, including at least facilitating a first electronic device scanning a memory of a second electronic device associated with at least one of the one or more viewers to at least partially determined the at least one selection signal, the at least one selection signal to revise at least one animated character of an audio-visual core portion with at least one replacement animated character with the audio-visual core portion; and receiving a dynamically customized audio-visual content including the audio-visual core portion at least partially modified with the at least one revised content portion in accordance with the at least one selection signal.

* * * * *